(12) United States Patent
Landig et al.

(10) Patent No.: US 12,429,651 B2
(45) Date of Patent: Sep. 30, 2025

(54) WAVEGUIDE WITH TUNABLE BULK REFLECTORS

(71) Applicant: Meta Platforms Technologies, LLC, Menlo Park, CA (US)

(72) Inventors: Renate Eva Klementine Landig, Kirkland, WA (US); Sihui He, Sunnyvale, CA (US); Miaomiao Xu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 345 days.

(21) Appl. No.: 18/076,236

(22) Filed: Dec. 6, 2022

(65) Prior Publication Data

US 2023/0367073 A1    Nov. 16, 2023

Related U.S. Application Data

(60) Provisional application No. 63/405,698, filed on Sep. 12, 2022, provisional application No. 63/395,284, (Continued)

(51) Int. Cl.
*G02B 6/293* (2006.01)
*F21V 8/00* (2006.01)

(52) U.S. Cl.
CPC ....... *G02B 6/29395* (2013.01); *G02B 6/0016* (2013.01)

(58) Field of Classification Search
CPC ........ G02B 27/0172; G02B 2027/0178; G02B 27/0081; G02B 6/0035; G02B 2027/0125;
(Continued)

(56) References Cited

U.S. PATENT DOCUMENTS

| 6,400,885 B1 | 6/2002 | Hu et al. |
| 7,884,977 B2 | 2/2011 | Mori |

(Continued)

FOREIGN PATENT DOCUMENTS

| CN | 210323583 U | 4/2020 |
| CN | 113075793 A | 7/2021 |

(Continued)

OTHER PUBLICATIONS

International Search Report and Written Opinion for International Application No. PCT/US2022/051755, mailed Apr. 26, 2023, 9 pages.

(Continued)

*Primary Examiner* — Michelle R Connelly
(74) *Attorney, Agent, or Firm* — Greenberg Traurig, LLP

(57) ABSTRACT

A waveguide for conveying image light in a display device is disclosed. The waveguide comprises a waveguide body, an input coupler configured to couple the image light into the waveguide body for propagating the image light within the waveguide body along a zigzag light path, and a plurality of slanted bulk mirrors disposed along the zigzag light path within the waveguide body and having a tunable reflectivity parameter for controlling a spatial distribution of image light portions out-coupled from the waveguide body by the plurality of slanted bulk mirrors. The waveguide may include a plurality of slanted polarization-selective bulk mirrors, and a liquid crystal layer configured to alter the polarization of the image light, the liquid crystal layer being disposed between a backplane electrode and a pixelated electrode configured to control the liquid crystal layer by application of a spatially-varying voltage profile.

20 Claims, 15 Drawing Sheets

Related U.S. Application Data filed on Aug. 4, 2022, provisional application No. 63/341,416, filed on May 12, 2022.

(58) Field of Classification Search
CPC ........ G02B 27/0093; G02B 2027/0118; G02B 2027/0123; G02B 2027/0138; G02B 27/017

See application file for complete search history.

(56) References Cited

U.S. PATENT DOCUMENTS

| | | |
|---|---|---|
| 8,086,044 B2 | 12/2011 | Feng et al. |
| 8,878,773 B1 | 11/2014 | Bozarth |
| 9,274,597 B1 | 3/2016 | Karakotsios et al. |
| 9,557,568 B1 | 1/2017 | Ouderkirk et al. |
| 9,664,824 B2 | 5/2017 | Simmonds et al. |
| 10,108,014 B2 | 10/2018 | Vallius et al. |
| 10,217,286 B1 | 2/2019 | Angel et al. |
| 10,295,723 B1 | 5/2019 | Lee et al. |
| 10,466,484 B1 | 11/2019 | Yoon et al. |
| 10,466,779 B1 | 11/2019 | Liu |
| 10,502,963 B1 | 12/2019 | Noble et al. |
| 10,571,699 B1 | 2/2020 | Parsons et al. |
| 10,678,116 B1 | 6/2020 | Lam et al. |
| 10,712,576 B1 | 7/2020 | McEldowney |
| 10,775,633 B1 | 9/2020 | Lee et al. |
| 10,838,132 B1 | 11/2020 | Calafiore et al. |
| 10,885,843 B1 | 1/2021 | Lu et al. |
| 10,890,823 B1 | 1/2021 | Jiang et al. |
| 11,120,728 B2 | 9/2021 | Nagasaki et al. |
| 11,176,367 B1 | 11/2021 | Alexander et al. |
| 11,393,430 B2 | 7/2022 | Nagasaki et al. |
| 11,397,465 B1 | 7/2022 | Mattila et al. |
| 12,061,343 B2 | 8/2024 | Amirsolaimani |
| 2004/0227838 A1 | 11/2004 | Atarashi et al. |
| 2007/0188837 A1 | 8/2007 | Shimizu et al. |
| 2008/0143820 A1 | 6/2008 | Peterson |
| 2008/0212161 A1 | 9/2008 | Valette et al. |
| 2008/0212942 A1 | 9/2008 | Gordon et al. |
| 2008/0309649 A1 | 12/2008 | Kojima et al. |
| 2009/0040580 A1 | 2/2009 | Mukawa |
| 2009/0196460 A1 | 8/2009 | Jakobs et al. |
| 2011/0234750 A1 | 9/2011 | Lai et al. |
| 2012/0188467 A1 | 7/2012 | Escuti et al. |
| 2012/0218481 A1 | 8/2012 | Popovich et al. |
| 2012/0249957 A1 | 10/2012 | Shibata et al. |
| 2012/0250980 A1 | 10/2012 | Gillard et al. |
| 2012/0254369 A1 | 10/2012 | Gillard et al. |
| 2012/0257005 A1 | 10/2012 | Browne |
| 2013/0099700 A1 | 4/2013 | Kreye et al. |
| 2013/0182066 A1 | 7/2013 | Ishimoto |
| 2014/0037213 A1 | 2/2014 | Niederberger et al. |
| 2014/0049452 A1 | 2/2014 | Maltz |
| 2014/0098010 A1 | 4/2014 | Travis |
| 2014/0232651 A1* | 8/2014 | Kress .............. G06F 3/013 345/158 |
| 2014/0300966 A1 | 10/2014 | Travers et al. |
| 2015/0160529 A1 | 6/2015 | Popovich et al. |
| 2015/0243718 A1 | 8/2015 | Kwon et al. |
| 2015/0253591 A1 | 9/2015 | Kato et al. |
| 2015/0323790 A1* | 11/2015 | Dominici .......... G02B 27/0172 345/7 |
| 2016/0029883 A1 | 2/2016 | Cox |
| 2016/0085300 A1 | 3/2016 | Robbins et al. |
| 2016/0241892 A1 | 8/2016 | Cole et al. |
| 2016/0342205 A1 | 11/2016 | Shigeta et al. |
| 2017/0307886 A1 | 10/2017 | Stenberg et al. |
| 2018/0046859 A1 | 2/2018 | Jarvenpaa |
| 2018/0073686 A1 | 3/2018 | Quilici et al. |
| 2018/0081322 A1 | 3/2018 | Robbins et al. |
| 2018/0143586 A1 | 5/2018 | Narducci et al. |
| 2018/0196263 A1 | 7/2018 | Vallius et al. |
| 2018/0232048 A1 | 8/2018 | Popovich et al. |
| 2018/0237696 A1 | 8/2018 | Tuffin et al. |
| 2018/0239177 A1 | 8/2018 | Oh |
| 2018/0275409 A1 | 9/2018 | Gao et al. |
| 2018/0307048 A1 | 10/2018 | Alexander et al. |
| 2018/0364487 A1 | 12/2018 | Yeoh et al. |
| 2019/0041634 A1 | 2/2019 | Popovich et al. |
| 2019/0079292 A1 | 3/2019 | Alexander et al. |
| 2019/0086674 A1 | 3/2019 | Sinay et al. |
| 2019/0094981 A1* | 3/2019 | Bradski ................ G06V 40/168 |
| 2019/0147564 A1 | 5/2019 | Yuan et al. |
| 2019/0243134 A1 | 8/2019 | Perreault et al. |
| 2019/0310456 A1 | 10/2019 | Meng et al. |
| 2019/0317450 A1 | 10/2019 | Yaroshchuk et al. |
| 2019/0361241 A1 | 11/2019 | Amitai |
| 2020/0041787 A1 | 2/2020 | Popovich et al. |
| 2020/0043398 A1 | 2/2020 | Salazar |
| 2020/0049996 A1 | 2/2020 | Yan et al. |
| 2020/0064633 A1 | 2/2020 | Maimone |
| 2020/0081252 A1 | 3/2020 | Jamali et al. |
| 2020/0116995 A1 | 4/2020 | Chi et al. |
| 2020/0116996 A1 | 4/2020 | Lee et al. |
| 2020/0143741 A1 | 5/2020 | Tsuboi et al. |
| 2020/0159084 A1 | 5/2020 | Choi |
| 2020/0183159 A1 | 6/2020 | Danziger |
| 2020/0183174 A1 | 6/2020 | Noui et al. |
| 2020/0271936 A1 | 8/2020 | Leibovici et al. |
| 2020/0336645 A1 | 10/2020 | Fukuda |
| 2020/0368616 A1 | 11/2020 | Delamont |
| 2020/0371388 A1* | 11/2020 | Geng ................ G02B 6/105 |
| 2020/0412965 A1 | 12/2020 | Yoshida |
| 2021/0011284 A1 | 1/2021 | Andreev et al. |
| 2021/0041948 A1 | 2/2021 | Berkner-Cieslicki et al. |
| 2021/0055555 A1 | 2/2021 | Chi et al. |
| 2021/0191122 A1 | 6/2021 | Yaroshchuk et al. |
| 2021/0199958 A1 | 7/2021 | Huang et al. |
| 2021/0199970 A1 | 7/2021 | Huang et al. |
| 2021/0208389 A1 | 7/2021 | Lu et al. |
| 2021/0208397 A1 | 7/2021 | Lu et al. |
| 2021/0209364 A1 | 7/2021 | Park et al. |
| 2021/0223549 A1 | 7/2021 | Maimone et al. |
| 2021/0405374 A1 | 12/2021 | Komanduri et al. |
| 2021/0405380 A1 | 12/2021 | Urness et al. |
| 2022/0004001 A1 | 1/2022 | Danziger et al. |
| 2022/0197376 A1 | 6/2022 | Boyle et al. |
| 2022/0299754 A1 | 9/2022 | Gollier et al. |
| 2022/0350219 A1 | 11/2022 | Danziger |
| 2022/0382061 A1 | 12/2022 | Schultz |
| 2022/0382064 A1 | 12/2022 | Rohn et al. |
| 2022/0390744 A1 | 12/2022 | Alasaarela |
| 2022/0390749 A1 | 12/2022 | Yun et al. |
| 2022/0394234 A1 | 12/2022 | Etigson et al. |
| 2022/0397956 A1 | 12/2022 | Lundell et al. |
| 2022/0413302 A1 | 12/2022 | Meitav et al. |
| 2022/0413603 A1 | 12/2022 | Held et al. |
| 2023/0014577 A1 | 1/2023 | Gollier et al. |
| 2023/0057514 A1 | 2/2023 | Fix et al. |

FOREIGN PATENT DOCUMENTS

| | | | |
|---|---|---|---|
| CN | 115698819 A | 2/2023 | |
| EP | 2767852 A1 | 8/2014 | |
| GB | 422680 A | 1/1935 | |
| GB | 2422680 A | 8/2006 | |
| GB | 2585211 A | 1/2021 | |
| JP | H0682851 A | 3/1994 | |
| KR | 20170094350 A | 8/2017 | |
| KR | 20180135646 A | 12/2018 | |
| KR | 20210004776 A | 1/2021 | |
| WO | WO-2013033274 A1 * | 3/2013 | ......... G02B 27/0081 |
| WO | 2019178398 A1 | 9/2019 | |
| WO | 2021030093 A1 | 2/2021 | |
| WO | 2021091622 A1 | 5/2021 | |
| WO | 2021242667 A1 | 12/2021 | |
| WO | 2022052949 A1 | 3/2022 | |

OTHER PUBLICATIONS

International Search Report and Written Opinion for International Application No. PCT/US2022/051781, mailed Apr. 18, 2023, 13 pages.

(56) References Cited

OTHER PUBLICATIONS

International Search Report and Written Opinion for International Application No. PCT/US2022/051801 mailed Apr. 14, 2023, 11 pages.
International Search Report and Written Opinion for International Application No. PCT/US2022/051805 mailed Apr. 13, 2023, 10 pages.
International Search Report and Written Opinion for International Application No. PCT/US2022/051814, mailed Jun. 2, 2023, 20 pages.
International Search Report and Written Opinion for International Application No. PCT/US2023/021926, mailed Sep. 4, 2023, 12 pages.
International Search Report and Written Opinion for International Application No. PCT/US2023/022012, mailed Sep. 1, 2023, 11 pages.
Aalizadeh M., et al., "Toward Electrically Tunable, Lithography-Free, Ultra-Thin Color Filters Covering the Whole Visible Spectrum," Scinetific Reports, vol. 8, No. 1, Jul. 27, 2018, 11 pages.
Chang A. S. P., "Tunable Liquid Crystal-Resonant Grating Filter Fabricated by Nanoimprint Lithography," IEEE Photonics Technology Letters, vol. 19, No. 19, Oct. 1, 2007, pp. 1457-1459.
Draper C.T., et al., Holographic Waveguide Head-Up Display with 2-D Pupil Expansion and Longitudinal Image Magnification, Applied Optics, Feb. 10, 2019, vol. 58, No. 5, pp. A251-A257.
International Search Report and Written Opinion for International Application No. PCT/US2022/051388, mailed Apr. 6, 2023, 12 pages.
International Search Report and Written Opinion for International Application No. PCT/US2022/051487, mailed Apr. 11, 2023, 8 pages.
International Search Report and Written Opinion for International Application No. PCT/US2022/051608, mailed Apr. 5, 2023, 11 pages.
International Search Report and Written Opinion for International Application No. PCT/US2022/051751, mailed Apr. 11, 2023, 14 pages.
International Search Report and Written Opinion for International Application No. PCT/US2022/051758, mailed Mar. 22, 2023, 9 pages.
International Search Report and Written Opinion for International Application No. PCT/US2022/051809, mailed Apr. 5, 2023, 10 pages.
Invitation to Pay Additional Fees for International Application No. PCT/US2022/051814, mailed Apr. 11, 2023, 14 pages.
Jolly S., et al., "Near-to-Eye Electroholography via Guided-Wave Acousto-Optics for Augmented Reality," Proceedings of SPIE, vol. 10127, Mar. 2, 2017, 11 pages.
Kollosche M., et al., "Voltage-Controlled Compression for Period Tuning of Optical Surface Relief Gratings," Optics Letters, vol. 36, No. 8, Apr. 15, 2011, pp. 1389-1391.
Lee K. M., et al., "Color-Tunable Mirrors Based on Electrically Regulated Bandwidth Broadening in Polymer-Stabilized Cholesteric Liquid Crystals," ACS Photonics, Sep. 17, 2014, pp. 1033-1041.
Lin I-T., et al., "Electro-Responsive Surfaces with Controllable Wrinkling Patterns for Switchable Light reflection-Diffusion-Grating Devices," Marterials Today, vol. 41, Dec. 2020, 11 pages.
Maimone A., et al., "Holographic Optics for Thin and Lightweight Virtual Reality," Facebook Reality Labs, ACM Trans. Graph. Article 67, vol. 39, No. 4, Jul. 2020, 14 pages.
Palto S.P., "Dynamic and Photonic Properties of Field-Induced Gratings in Flexoelectric LC Layers," Crystals, 2021, vol. 11, 894, 13 pages.
Pogue R.T., et al., Electrically Switchable Bragg Gratings from Liquid Crystal/Polymer Composites, Applied Spectroscopy, 2000, vol. 54, No. 1, pp. 12A-28A.
Shih W-C., et aL, "High-Resolution Electrostatic Analog Tunable Grating With a Single-Mask Fabrication Process," Journal of Microelectromechanical Systems, vol. 15, No. 4, Aug. 2006, pp. 763-769.
Sirleto L., et al., "Electro-Optical Switch and Continuously Tunable Filter based on a Bragg Grating in a Planar Waveguide with a Liquid Crystal Overlayer," Optical Engineering, vol. 41, No. 11, Nov. 2002, pp. 2890-2898.
Smalley D.E., et al., Status of Leaky Mode of Holography, Photonics, 2021, 8, 292,22 pages.
Xiang J., et al., "Electrically Tunable Selective Reflection of Light from Ultraviolet to Visible and Infrared by Heliconical Cholesterics," Advanced Materials, vol. 27, Issue19, May 20, 2015, 5 pages.
Xiang J., et al., "Electrooptic Response of Chiral Nematic Liquid Crystals with Oblique Helicoidal Director," Physical Review Letters, 2014, 112, 217801, 14 pages.
Zhan T., et al., "High-Efficiency Switchable Optical Elements for Advanced Head-Up Displays," Journal of the Society for Information Display, Mar. 21, 2019, vol. 27, No. 4, pp. 223-231.
Office Action mailed Mar. 12, 2025 for European Patent Application No. 22847298.1, filed on Dec. 4, 2022, 5 pages.

* cited by examiner

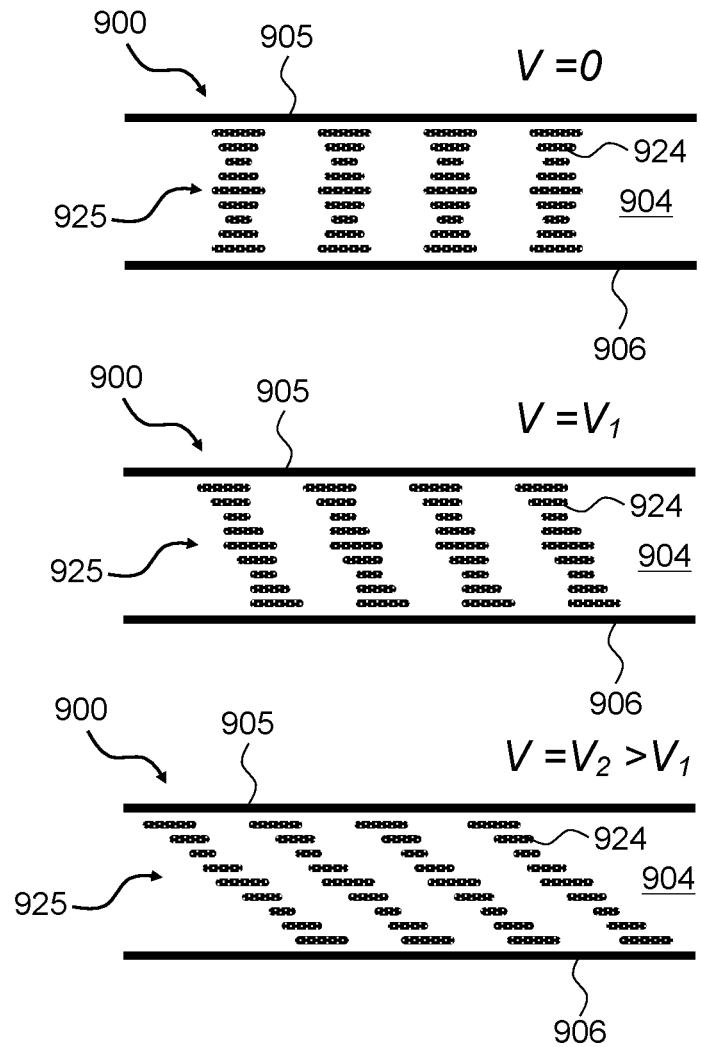
FIG. 9A
FIG. 9B
FIG. 9C
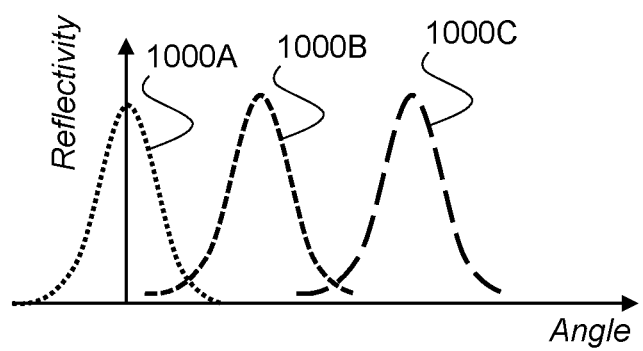
FIG. 10

WAVEGUIDE WITH TUNABLE BULK REFLECTORS

REFERENCE TO RELATED APPLICATIONS

This application claims priority from U.S. Provisional Patent Application No. 63/341,416 entitled "Active Eyebox Solutions and Application", filed on May 12, 2022; U.S. Provisional Patent Application No. 63/395,284 entitled "Waveguide with Tunable Bulk Reflectors", filed on Aug. 4, 2022; and U.S. Provisional Patent Application No. 63/405,698 entitled "Waveguide with Tunable Bulk Reflectors", filed on Sep. 12, 2022, all of which being incorporated herein by reference in their entireties.

TECHNICAL FIELD

The present disclosure relates to visual display devices and related components, modules, and methods.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optics to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput ocular lenses, and other optical elements in the image forming train.

BRIEF DESCRIPTION OF THE DRAWINGS

Exemplary embodiments will now be described in conjunction with the drawings, in which:

FIG. 9A is a side cross-sectional view of a cholesteric liquid crystal implementation of the waveguide of FIGS. 8A and 8B at zero applied voltage;

FIG. 9B is a side cross-sectional view of a cholesteric liquid crystal implementation of the waveguide of FIGS. 8A and 8B at an intermediate applied voltage;

FIG. 9C is a side cross-sectional view of a cholesteric liquid crystal implementation of the waveguide of FIGS. 8A and 8B at a maximum applied voltage;

FIG. 10 is a graph of reflectivity vs. angle for the waveguides of FIGS. 9A to 9C;

DETAILED DESCRIPTION

Figure 1A:
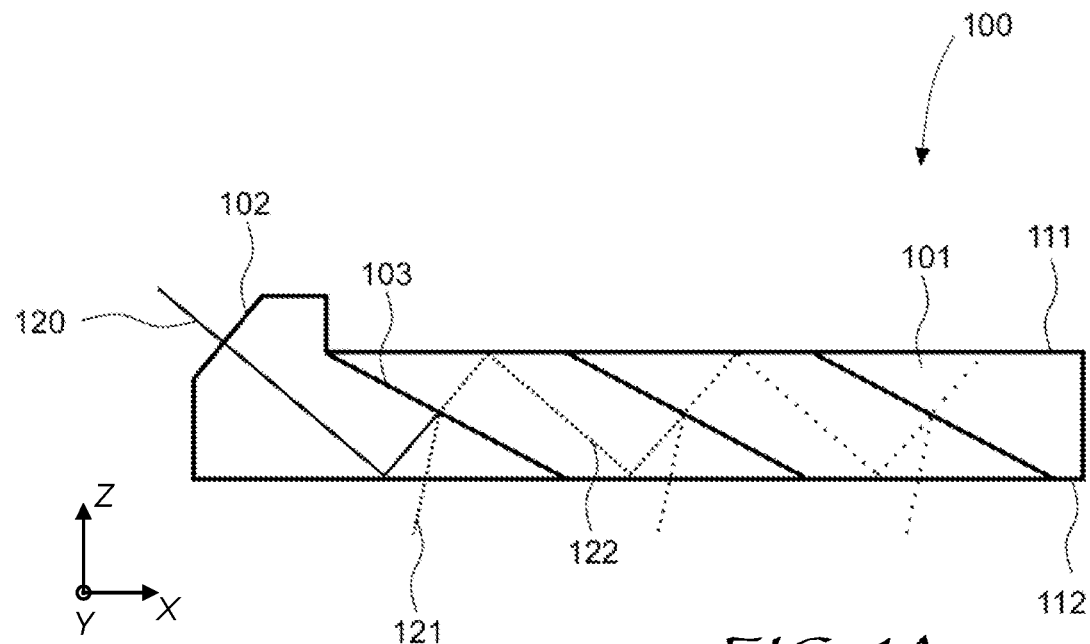
FIG. 1A is a side cross-sectional view of a waveguide of this disclosure with a first tunable slanted bulk mirror tuned to high reflection.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. In FIGS. 1A-1B, 3A-3B, and FIGS. 11-13, similar reference numerals denote similar elements.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Near-eye displays and augmented reality displays may use pupil replicating waveguides to expand image light carrying a projected image over an eyebox of the display, i.e., over an area where a user's eye may be located during normal operation of the display. A pupil replicating waveguide is typically a parallel slab of a transparent material propagating the image light in a zigzag pattern by total internal reflection (TIR) from the waveguide's top and bottom surfaces.

One drawback of pupil replicating waveguides is that by spreading the image light over an extended area, a considerable portion of the image light coupled into the pupil replicating waveguide never reaches the eye pupil and instead illuminates user's eyes and face. This causes a decrease of the overall light utilization efficiency. A low light utilization efficiency may be compensated by using a brighter light source requiring a larger and heavier battery, which increases the size and weight of the display. Furthermore, when the waveguide is a part of an augmented reality system, the image light from an image source internal to the augmented reality system has to compete in brightness with outside light to be visible by the viewer. The augmented image brightness may need to be increased by several orders of magnitude for the generated imagery to be visible in broad daylight. To compete with the outside light, the internal image light source brightness needs to be increased, which may be challenging. It is therefore highly desirable to improve the light utilization efficiency by a pupil replicating waveguide.

In accordance with this disclosure, light utilization efficiency of a near-eye display may be improved by providing a waveguide including a plurality of bulk slanted mirrors having individually tunable reflectivity magnitude and/or a direction of maximum reflectivity of the mirrors. In other words, the reflectivity magnitude and/or direction of the bulk mirror set is tunable in a spatially selective manner. This enables controlling the spatial distribution of the image light portions to match the eye location in the eyebox, and/or to correspond to a portion of a field of view currently displayed by the image projector. Tailoring the spatial distribution of the image light to the eye location/gaze direction/FOV portion being displayed decreases the required brightness, or the total optical power, of the image light produced by the image light source.

In accordance with the present disclosure, there is provided a waveguide for conveying image light in a display device, the waveguide comprising a waveguide body comprising first and second opposed surfaces running parallel to each other, an input coupler configured to couple the image light into the waveguide body for propagating the image light within the waveguide body along a zigzag light path defined by alternating reflections of the image light from the first and second surfaces, and a plurality of slanted bulk mirrors disposed along the zigzag light path within the waveguide body and having a tunable reflectivity for controlling a spatial distribution of image light portions outcoupled from the waveguide body by the plurality of slanted bulk mirrors.

In some embodiments, a slanted bulk mirror of the plurality of slanted bulk mirrors comprises a voltage-controlled mirror having at least one of a reflectivity magnitude or a direction of maximum reflectivity variable by application of voltage to the voltage-controlled mirror. In some embodiments, slanted bulk mirror(s) of the plurality of slanted bulk mirrors are polarization-selective. In such embodiments, the waveguide may further include a liquid crystal layer in the zigzag light path within the waveguide body for spatially-selective control of a state of polarization of the image light propagating along the zigzag light path, thereby controlling the spatial distribution of the image light portions.

By way of a non-limiting illustrative example, the waveguide body may include a stack of a substrate supporting the plurality of slanted bulk mirrors, a backplane electrode, the liquid crystal layer, and a pixelated electrode layer for application of spatially-varying electric field to the liquid crystal layer by applying spatially-varying electric field between the backplane and pixelated electrode layers. The zigzag light path runs through the stack. The liquid crystal layer may include e.g. nematic or cholesteric liquid crystal molecules.

In some embodiments, the input coupler includes a slanted bulk mirror with tunable reflectivity. In such embodiments, a second waveguide body may be provided downstream of the first waveguide body. The tunable slanted bulk mirror of the input coupler may regulate a ratio of the image light propagating in the first and second waveguide bodies. The two waveguide bodies may have a plurality of slanted bulk reflectors with different lateral location and/or angle of the reflectors, for dynamic control of the displayed portion of field of view, and for redirecting the output optical power density to follow the eye location and/or orientation. The out-coupling slanted mirrors may be non-tunable, or may also have a tunable reflectivity in some embodiments.

The plurality of slanted bulk mirrors may include a two-dimensional array of slanted bulk mirrors. The plane of the array may be parallel to the opposed surfaces of the waveguide body, or non-parallel e.g. perpendicular to the surfaces. The plurality of slanted bulk mirrors may include a three-dimensional array of slanted bulk mirrors for maximum flexibility of light out-coupling. Furthermore in some embodiments, the in-coupling and/or out-coupling slanted bulk mirrors may have a spatially non-uniform reflectivity, e.g. they may be segmented into two, four, etc. segments or portions, each segment or portion having an independently variable spatially uniform reflectivity, including the magnitude of reflectivity and/or angle of maximum reflectivity.

In accordance with the present disclosure, there is provided a display device, e.g. a near-eye display device, comprising an image projector configured to provide image light carrying an image in angular domain, and a waveguide of this disclosure. The display device may include a controller operably coupled to the waveguide body and configured to control the reflectivity of the plurality of slanted bulk mirrors in a spatially-selective manner in accordance with a portion of a field of view currently displayed by the image projector. The controller may be configured to increase those of the image light portions that carry the portion of the field of view displayed by the image projector.

The display device may further include an eye tracking system configured to determine a position of a pupil of a user's eye at an eyebox of the display device. The controller may be operably coupled to the waveguide body and the eye tracking system and configured to control the reflectivity of the plurality of slanted bulk mirrors in a spatially-selective manner in accordance with the position of the pupil determined by the eye tracking system. The controller may operate so as to increase those of the image light portions that are directed at the eye pupil.

In accordance with the present disclosure, there is further provided a method for conveying image light from an image projector to an eyebox of a display device. The method includes coupling the image light into a waveguide body, propagating the image light in the waveguide body along a zigzag light path defined by alternating reflections of the image light from first and second opposed surfaces of the waveguide body, out-coupling portions of the image light from the waveguide body by using a plurality of slanted bulk mirrors disposed along the zigzag light path within the waveguide body and having a tunable reflectivity, and controlling a spatial distribution of image light portions out-coupled from the waveguide body by the plurality of slanted bulk mirrors by tuning the reflectivity of the plurality of slanted bulk mirrors.

In some embodiments, controlling the spatial distribution of image light portions may include tuning the reflectivity of the plurality of slanted bulk mirrors by applying a voltage to each bulk mirror, each bulk mirror being a voltage-controlled mirror. Controlling the spatial distribution of image light portions may include controlling the reflectivity of the plurality of slanted bulk mirrors in a spatially-selective manner in accordance with a portion of a field of view currently displayed by the image projector. Those of the image light portions that carry the portion of the field of view displayed by the image projector to a user's eye may be increased as the result. In embodiments where controlling the spatial distribution of image light portions includes determining a position of a pupil of a user's eye at the eyebox of the display device, the method may further include controlling the reflectivity of the plurality of slanted mirrors in a spatially-selective manner in accordance with the determined position of the eye pupil. Controlling the spatial distribution of image light portions may be performed so as to increase those of the image light portions that reach the user's eye.

Figure 1B:
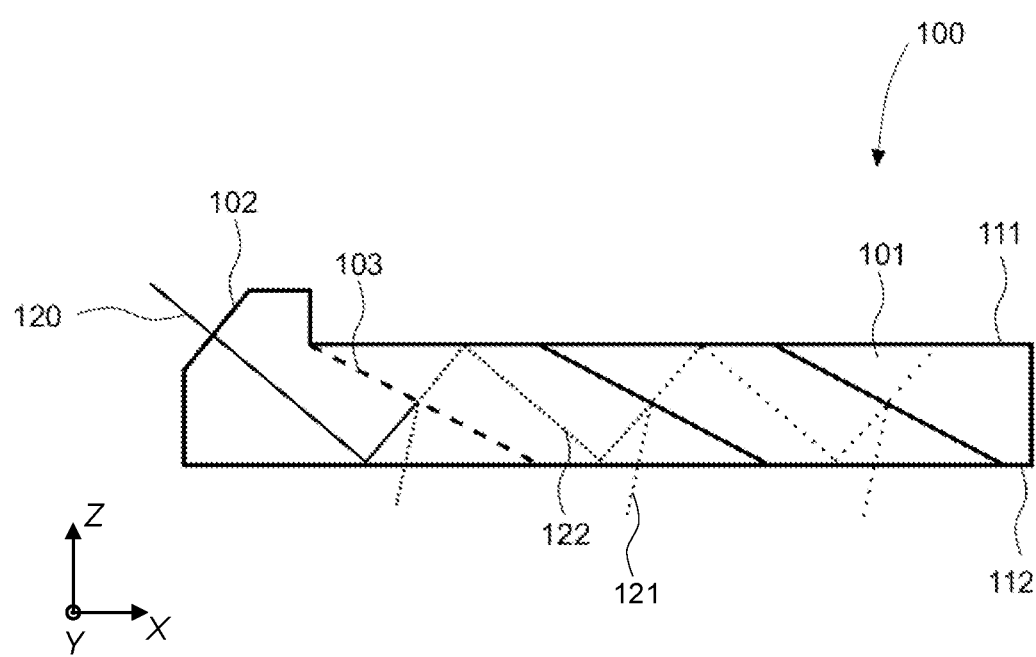
FIG. 1B is a side cross-sectional view of the waveguide of FIG. 1A with a second tunable slanted bulk mirror tuned to high reflection while the first one is tuned to high transmission.

Referring now to FIGS. 1A and 1B, a waveguide 100 is shown in a side cross-sectional view. The waveguide 100 includes a waveguide body 101 having first 111 and second 112 opposed surfaces running parallel to each other. The first 111 and second 112 opposed surfaces may be outer surfaces of the waveguide body 101. The waveguide body 101 may include a transparent substrate such as a glass, plastic, an oxide, or an inorganic crystal substrate, for example. The transparent substrate may have flat or curved outer surfaces, and may be coated with a low-index material for protection against dirt and fog.

The waveguide 100 includes an input coupler 102 configured to couple image light 120 into the waveguide body 101. The input coupler 102 may include a prism, a mirror of a constant or variable reflectivity, etc. The input coupler 102 may further include a linear polarizer for polarizing impinging image light. Upon entering the waveguide body 101, the image light 120 propagates within the waveguide body 101 by a series of total internal reflections (TIRs) from the first 111 and second 112 surfaces. The image light 120 propagates along a zigzag light path 122 defined by alternating reflections of the image light 120 from the first 111 and second 112 surfaces of the waveguide body 101. The image light 120 carries an image in angular domain, i.e. an image where individual image elements (pixels) are represented by a ray angle of a ray fan covering an entire FOV of the image. The brightness and/or color of the pixels of the image in angular domain are represented by brightness and/or color of a light ray at the corresponding beam angle.

During propagation of the image light 120 along the zigzag light path 122, the image light 120 propagates through a plurality of slanted bulk mirrors 103 supported by the substrate of the waveguide body 101, e.g. embedded into the substrate. The bulk mirrors 103 are disposed along the zigzag light path 122. The bulk mirrors 103 may be slanted in a parallel manner, i.e. may be parallel to one another with a same slant angle. Each bulk mirror 103 of the plurality of parallel slanted bulk mirrors 103, or at least some of such mirrors, may have a tunable reflectivity. The bulk mirrors 103 may comprise a liquid crystal material and/or a multi-layer thin film coating, for example. The bulk mirrors 103 may be polarization-selective, reflecting one polarization of impinging light and transmitting the other, orthogonal polarization. To that end, the bulk mirrors may include polarizing optical coatings, e.g. multilayer dielectric coatings.

A reflectivity magnitude of each bulk mirror 103 may be continuously tuned between a first state and a second state, depending on a control signal applied to the bulk mirror 103. When in the first state, the bulk mirror 103 has a maximum set reflectivity magnitude, reflecting the image light 120 and out-coupling the image light 120 from the waveguide body 101. When in the second state, the bulk mirror 103 may be substantially transparent to image light 120. Therefore, by tuning the reflectivity magnitude of at least one bulk mirror 103, the spatial distribution of image light portions 121 out-coupled from the waveguide body 101 by the plurality of parallel slanted bulk mirrors 103 can be controlled. In embodiments where the reflectivity magnitude of the bulk mirrors 103 is polarization-selective, at least one, or more than one of the bulk mirrors 103, may have its reflectivity magnitude independently tuned between the first and second states, but only for one polarization of impinging light.

In embodiments where the reflectivity magnitude is continuously tuned between the first and second states, the bulk mirrors 103 may be tuned to be partially transparent to the image light 120. Similarly, the tuning of bulk mirrors 103 can be done with an image light of a different polarization state or of a plurality of polarization states. FIG. 1A shows the waveguide 100 with all the bulk mirrors 103 in the first state i.e. substantially non-transparent to the light of the image light 120. FIG. 1B shows the same waveguide 100 as in FIG. 1A with the reflectivity of the leftmost bulk mirror 103 reduced, allowing a larger portion 121 of the image light 120 to propagate further along the light path 122, and thus shifting the lateral position of the out-coupled image light portion 121.

Figure 2:
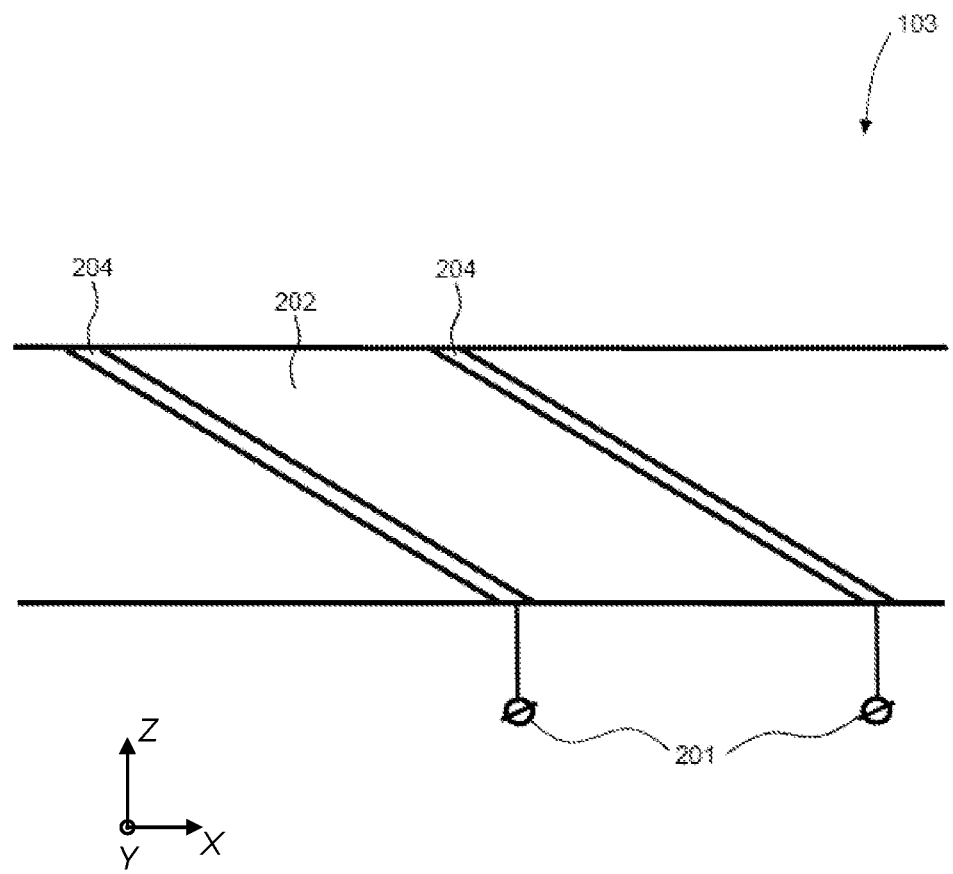
FIG. 2 is a magnified view of a tunable slanted bulk mirror of the waveguides of FIGS. 1A and 1B.

Referring to FIG. 2, one of the bulk mirrors 103 is shown in a magnified cross-sectional view. The bulk mirror 103 of FIG. 2 includes an electrically responsive reflector layer 202 between two transparent electrodes 204 coupled to electric terminals 201. When a voltage is applied to the terminals 201, the electrically responsive reflector layer 202 changes its reflectivity magnitude depending on the magnitude of the applied voltage. In embodiments where the material of the bulk mirrors 103 is a liquid crystal material, the reflectivity of the material changes when a voltage is applied due to the liquid crystal molecules changing their orientation. In some embodiments, the electrically responsive reflector layer 202 may include LiNbO₃, LBO, KTP crystals, etc.

Figure 3A:
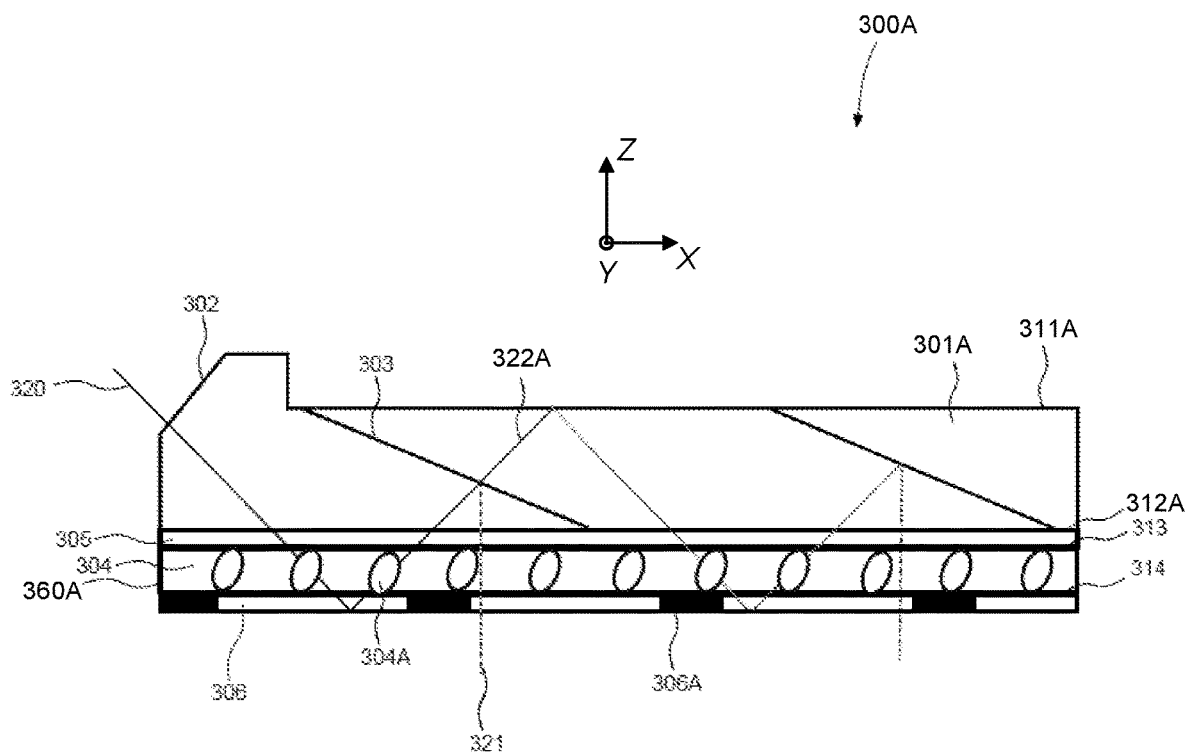
FIG. 3A is a partial side cross-sectional view of a waveguide embodiment with a liquid crystal layer forming a stack with the waveguide body.

Referring now to FIG. 3A, a waveguide 300A is similar to the waveguide 100 of FIGS. 1A and 1B, and includes similar elements. The waveguide 300A of FIG. 3A includes a waveguide body 301A having first 311A and second 312A opposed surfaces running parallel to one another. The waveguide body 301A may include a transparent substrate such as, for example, glass, plastic, oxide, and/or an inorganic crystal substrate. The waveguide 300A includes an input coupler 302, e.g. an in-coupling prism (as illustrated) and/or an in-coupling mirror, configured to couple image light 320 into the waveguide body 301A. The input coupler 302 may include a polarizing element such as a linear polarizer, for example.

The waveguide body 301A further includes a liquid crystal (LC) cell 360A comprising an LC layer 304 bound by transparent substrates having opposed first 313 and second 314 inner surfaces. The LC layer 304 may include an LC fluid comprised of LC molecules 304A, e.g. nematic or cholesteric LC molecules. The transparent substrates may be made of e.g. glass, plastic, fused silica, a metal oxide, and/or an inorganic crystal, to name just a few examples. In some embodiments, the waveguide body 301A may function as the top substrate of the LC cell 360A, i.e. the LC cell 360A may not have a separate dedicated top substrate.

However implemented, the top substrate of the LC cell 360A may support a backplane electrode layer 305 disposed between a substrate of the waveguide body 301A and the liquid crystal layer 304. The LC cell 360A may include a pixelated electrode layer 306 for applying a spatially-varying electric field between the backplane electrode 305 layer and individual pixels 306A of the pixelated electrode layer 306 and across the LC layer 304. The electric field causes the LC molecules 304A to change their spatial orientation within the respective pixels 306A. The voltage-dependent orientation of the LC molecules 304A defines local birefringent properties of the LC layer 304, allowing the LC layer 304 to change a polarization state of the image light 320 propagating through the LC layer 304. Due to the pixelated nature of the bottom electrode layer 306, the polarization state of the image light 320 may be controlled in a spatially-selective manner to provide desired variations of the polarization state of the image light 320 as the image light 320 propagates in the waveguide body 301A.

The waveguide body 301A may further include a plurality of polarization-selective slanted bulk mirrors 303. The bulk mirrors 303 may be parallel to one another. Upon having been coupled into the waveguide body 301A by the input coupler 302, the image light 320 propagates along a zigzag light path 322A within the waveguide body 301A, including the backplane electrode layer 305 and the liquid crystal layer 304, by a series of TIRs from the first surface 311A of the waveguide body 301A and the outer surface of LC cell 360A, e.g. from the outer surface of its bottom transparent substrate, as illustrated. The waveguide body 301A, the liquid crystal layer 304, and the backplane electrode layer 305 may form a stack substantially transparent to the image light 320, for the image light 320 to propagate within the stack. The index of refraction of the substrates of the waveguide body 301A, liquid crystal layer 304, and the backplane electrode layer 305 may be the matched, thus reducing undesirable Fresnel reflections of the image light 320 on the light path 322A running through the stack.

The image light 320 sequentially propagates through the polarization-selective bulk mirrors 303 and the LC layer 304. The liquid crystal layer 304 is configured to control the state of polarization of the image light 320 in a spatially-selective manner, so as to control the magnitude or the optical power level of the image light portions 321 out-coupled by the individual polarization-selective bulk mirrors 303. Thus, the spatial distribution of the image light portions 321 can be controlled by applying voltages to individual pixels 306A of the pixelated electrode layer 306. The voltage pattern applied across the LC cell 360A defines the spatial distribution of the out-coupled image light portions 321 in a predictable, controllable manner.

Figure 3B:
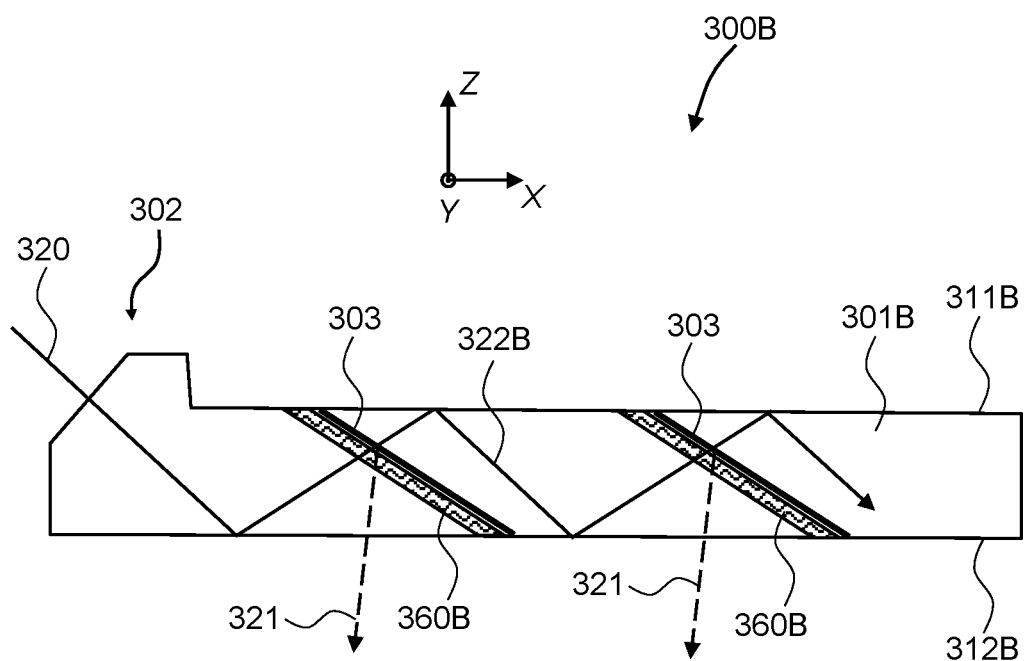
FIG. 3B is a partial side cross-sectional view of a waveguide embodiment with a liquid crystal layer forming a stack with slanted bulk reflectors.

Turning to FIG. 3B, a waveguide 300B is a variant of the waveguide 300A of FIG. 3A, and includes similar elements. The waveguide 300B of FIG. 3B includes a waveguide body 301B having first 311B and second 312B opposed outer surfaces running parallel to one another. The waveguide body 301B may include a transparent substrate such as, for example, glass, plastic, oxide, and/or an inorganic crystal substrate. The waveguide 300B includes the input coupler 302, e.g. an in-coupling prism (as illustrated) and/or an in-coupling mirror, configured to couple the image light 320 into the waveguide body 301B. The input coupler 302 may include a polarizing element such as a linear polarizer, for example.

The waveguide body 301B may further include the plurality of polarization-selective slanted bulk mirrors 303. The bulk mirrors 303 may be parallel to one another. Upon having been coupled into the waveguide body 301B by the input coupler 302, the image light 320 propagates along a zigzag light path 322B within the waveguide body 301B, by a series of TIRs from the first 311B and second 312B surfaces of the waveguide body 301B.

The waveguide body 301B may further include a plurality of LC cells 360B in the light path 322B upstream of each bulk mirror 303 as illustrated, although in some embodiments, the LC cells 360B may be disposed downstream of the respective bulk mirrors 303. The LC cells 360B generally include similar elements/layers as the LC cell 360A of FIG. 3A, although the LC cells 360B need not include a pixelated electrode layer, i.e. the LC cells 360B may include a pair of continuous (non-patterned) transparent electrodes for polarization control uniform across the entire LC cell 360B. The LC cells 360B may be disposed near to and/or parallel to the respective bulk mirrors 303, and may form stacks with the respective bulk mirrors 303, as illustrated.

The purpose of the LC cells 360B is to control the polarization state of the image light 320 along the light path 322B, and accordingly to control the spatial distribution of the out-coupled portions 321 of the image light 320 via the polarization state of the image light 320. If, for example, the bulk mirrors 303 are configured to reflect light of a first linear polarization and transmit through light of a second, orthogonal polarization, the LC cell(s) 360B may be tuned to convert the polarization state of the image light 320 to be the first polarization state when out-coupling by respective downstream bulk mirror(s) 303 is required. By the same principle, the LC cell(s) 360B may be tuned to convert the polarization state of the image light 320 to be the second polarization state when respective bulk mirrors 303 are to propagate the image light 320 through the bulk mirrors 303. Of course, in an intermediate polarization state of the image light 320, controllable portions 321 of the image light 320 may be out-coupled, and the LC cell(s) 360B may be tuned to provide the required controllable portion(s) of the image light 320 to be out-coupled from the waveguide body 301B, in accordance with a desired spatial profile of optical power distribution of the image light portions 321.

Figure 4:
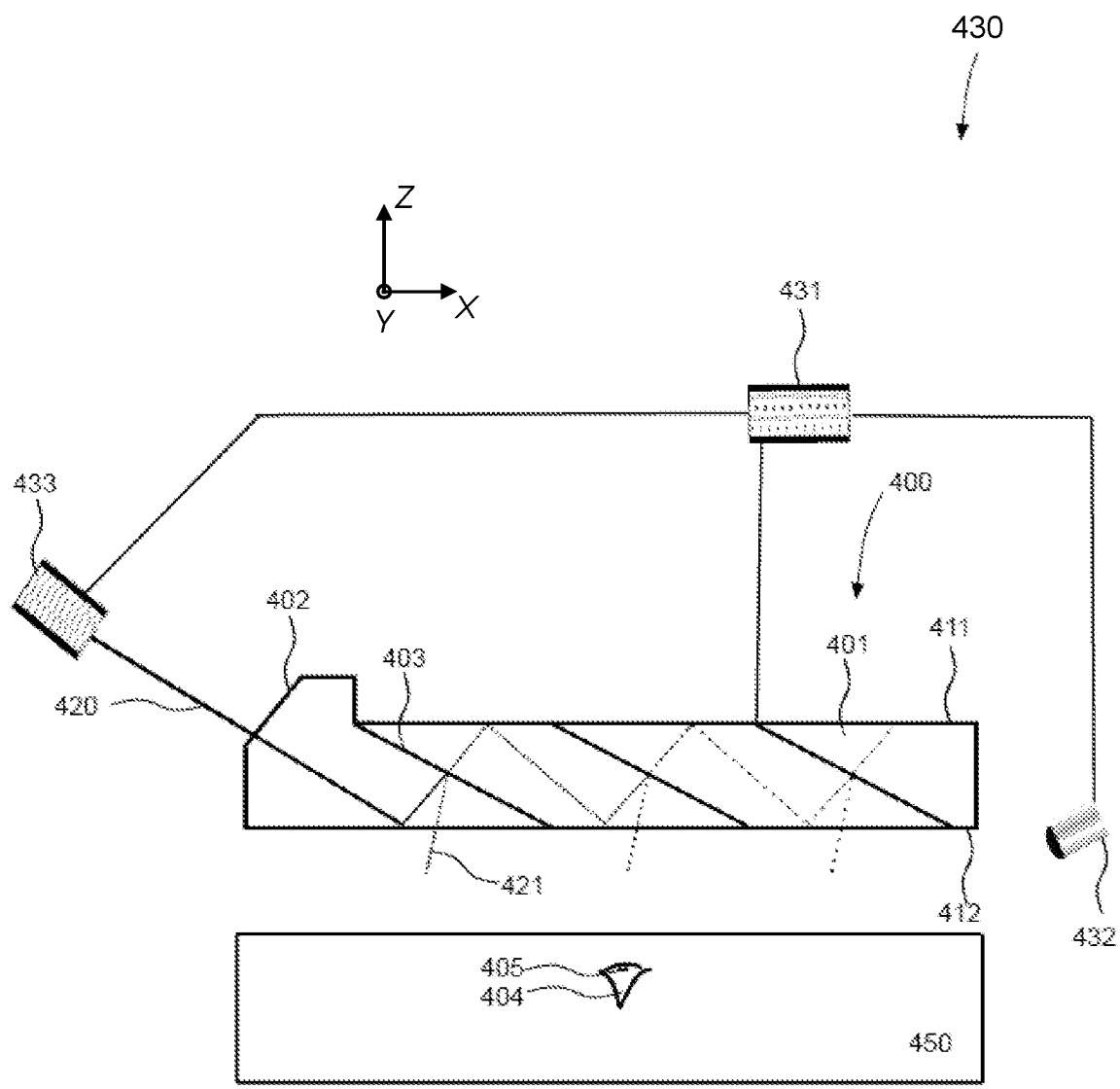
FIG. 4 is a schematic view of a near-eye display using a waveguide of FIGS. 1A-1B or FIGS. 3A-3B.

Referring now to FIG. 4 with further reference to FIG. 1A, a display device 430 includes an image projector 433 configured to provide image light 420 carrying an image in an angular domain, and a waveguide 400 for conveying the image light 420 carrying an image in angular domain to an eyebox 450 for viewing by a user's eye 404. The waveguide 400 of FIG. 4 may include the waveguide 100 of FIGS. 1A-1B, the waveguide 300A of FIG. 3A, or the waveguide 300B of FIG. 3B, for example. The image projector 433 may be e.g. a scanning image projector, or may be based on a microdisplay panel coupled to a collimator. In the embodiment shown, the display device 430 is a near-eye display device providing the image light 420 to the eyebox 450.

The display device 430 may further include a controller 431 operably coupled to the waveguide body 401, e.g. to each bulk mirror 403 of the plurality of slanted bulk mirrors 403 of the waveguide body 401 and/or to an LC cell, such as the LC cell 360A depicted in FIG. 3A and/or the LC cell 360B depicted in FIG. 3B. The controller 431 (FIG. 4) may be configured to control the reflectivity of the plurality of slanted bulk mirrors 403 in a spatially-selective manner, by controlling the reflectivity of individual bulk mirrors 403 and/or by controlling polarization state of the image light with polarization-selective bulk mirrors 403. The controller 431 is further operably coupled to the image projector 433. The image projector 433 may be e.g. a scanning projector that renders an FOV by scanning a collimated light beam, or a microdisplay based projector.

In operation, the controller 431 may control the spatial distribution of reflectivities of the bulk mirrors 403 based on information about a portion of a field of view (FOV) currently displayed by the image projector 433. The controller 431 may be configured to control the image projector 433 to produce image light 420 in accordance with the FOV portion currently displayed by the image projector 433. In accordance with this disclosure, the controller 431 may be configured to increase those of the image light 420 portions that carry the portion of the FOV currently displayed by the image projector to the eye 404.

The display device 430 may further include an eye tracking system 432 for determining at least one of position or orientation of the eye 404 in the eyebox 450. The controller 431 may be operably coupled to the eye tracking system 432 for determining an instant position of a pupil 405 of the eye 404 in the eyebox 450 of the display device 430 based on the determined position and orientation of the eye 404. The eye tracking system 432 may update the information about the position of the pupil 405 of the user's eye 404 in real time. The controller 431 may be configured to control the reflectivity of the plurality of slanted bulk mirrors 403 based on the information received from the eye tracking system 432, and/or based on the current FOV portion displayed by the image projector 433. The controller 431 may be configured to increase those of the image light 420 portions 421 that are directed at the eye pupil 405, while attenuating image light portions 421 that are missing the eye pupil 405 to conserve electricity by better utilizing the image light 420. By redistributing the image light portions 421 to mostly propagate towards the eye pupil 405, the controller 431 increases the optical power level of the image light 420 that reaches the eye pupil 405, thereby considerably improving wall plug efficiency of the display device 430.

Figure 5A:
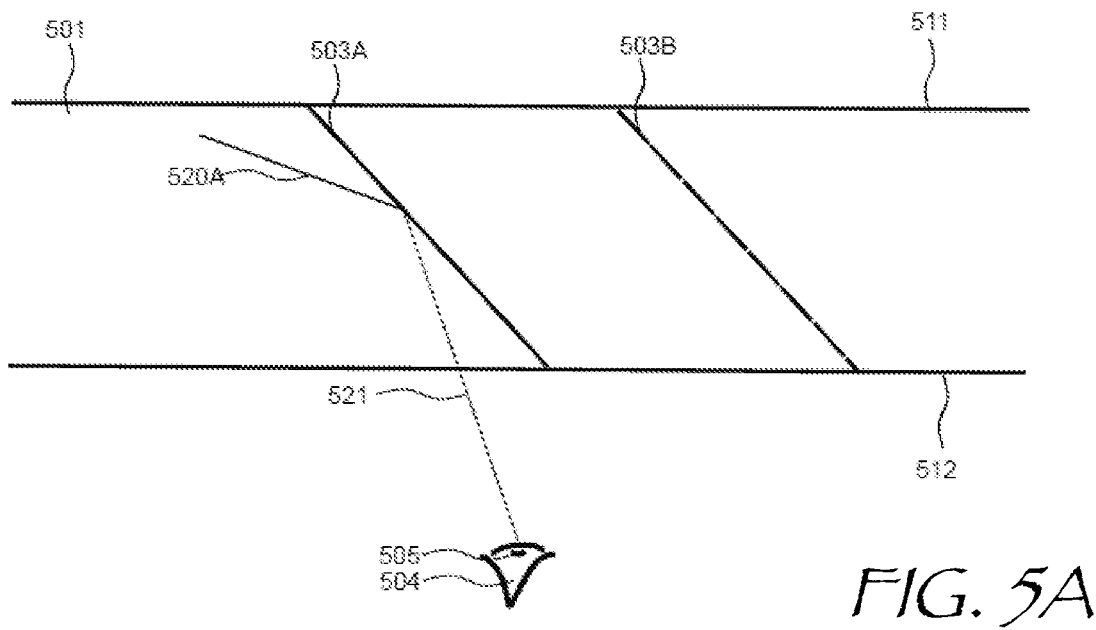
FIG. 5A is a side cross-sectional view of a waveguide tuned to out-couple a first field of view (FOV) portion.
Figure 5B:
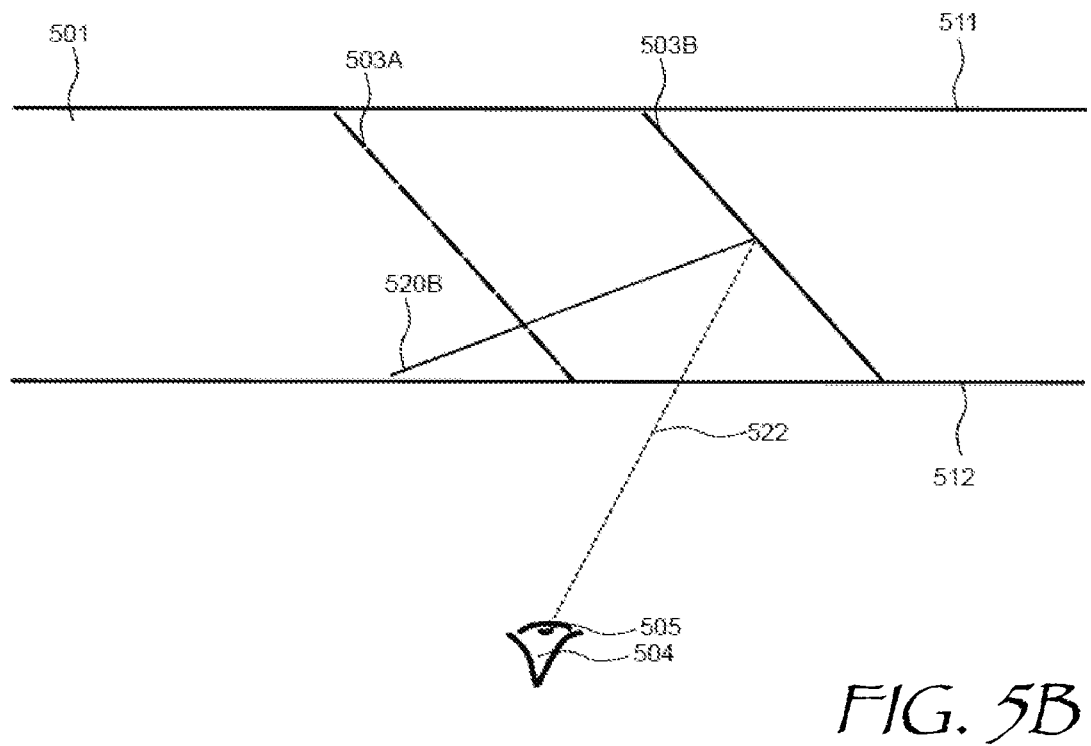
FIG. 5B is a side cross-sectional view of the waveguide of FIG. 5A tuned to out-couple a second, different FOV portion.

FIG. 5A and FIG. 5B illustrate how image light may be out-coupled from a waveguide in an FOV-dependent manner. FIGS. 5A and 5B show a portion of a waveguide body 501, which is similar to the waveguide body 401 of FIG. 4. The waveguide body 501 of FIGS. 5A and 5B includes upper 511 and lower 512 opposed surfaces and two tunable mirrors 503A and 503B in between. At a first moment in time, the image light carries a first portion of the FOV represented by a first ray 520A. To convey the first FOV portion to the location of a pupil 505 of a user's eye 504, the left bulk mirror 503A is tuned to a substantially non-transparent, fully reflective state, or to a mostly reflective state and a partially transparent state. Most of the image light is reflected by the left bulk mirror 503A and out-coupled as a first light beam portion (first ray 521) propagating towards the pupil 505 of the user's eye 504.

At a subsequent, second moment in time, the image light may carry a second portion of the FOV, as represented by a second ray 520B in FIG. 5B. The left bulk mirror 503A has its reflectivity reduced to propagate most of image light further to the right bulk mirror 503B. The image light 520 propagates through the left bulk mirror 503A as a largely unaffected light ray 522. The right bulk mirror 503B is tuned to a fully reflective state, or to a state with an increased reflectivity. Most of, or the entire image light is reflected by the right bulk mirror 503B and is out-coupled towards the user's eye pupil 505 as a light ray 522. The reflected light ray 522 (FIG. 5B) reaches substantially the same spatial location as reflected ray 521 (FIG. 5A). The bulk mirrors 503A and 503B may be tuned to non-fully reflective states to provide a more smooth light control, without sharp boundaries between different FOV portions, for convenience of observation, and to avoid sharp brightness drops due to a rapid eye movement.

Figure 6A:
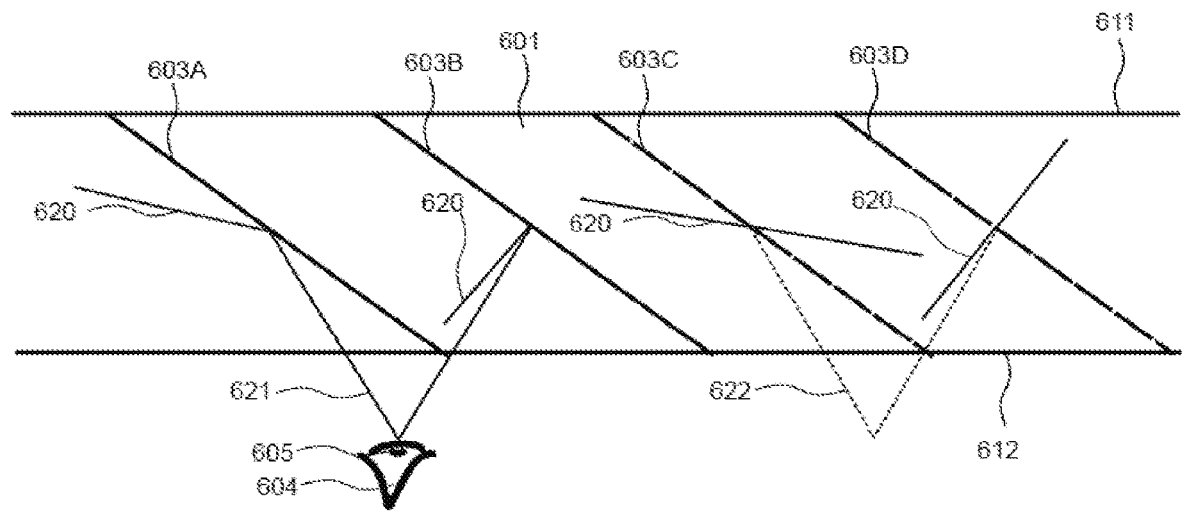
FIG. 6A is a side cross-sectional view of a waveguide tuned to out-couple the image light at a first eye location.
Figure 6B:
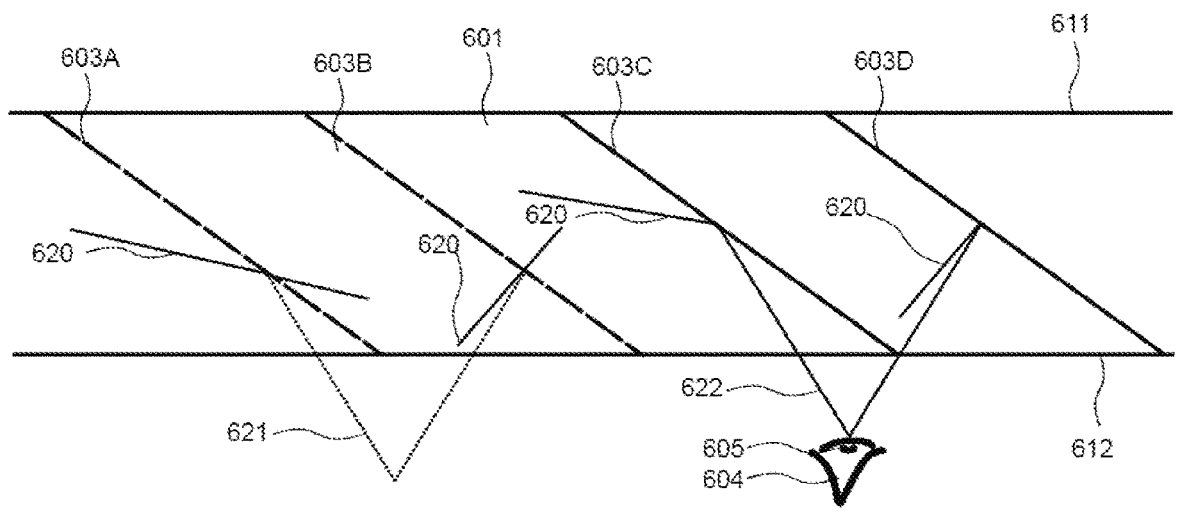
FIG. 6B is a side cross-sectional view of a waveguide tuned to out-couple the image light at a second, shifted eye location.

FIG. 6A and FIG. 6B illustrate how image light 620 may be out-coupled dependent on eye pupil location in the eyebox, making the out-coupled light follow an instant eye pupil position. FIGS. 6A 6B show a portion of a waveguide body 601, which is similar to the waveguide body 401 of FIG. 4, and operates in a similar manner. The waveguide body 601 of FIGS. 6A and 6B includes upper 611 and lower 612 opposed surfaces and tunable bulk mirrors 603A, 603B, 603C, and 603D disposed between the upper 611 and lower 612 surfaces.

Referring first to FIG. 6A, a user's eye 604 is located on the left side of the illustrated waveguide portion. To direct the image light 620 to the current eye 604 location, the two leftmost bulk mirrors 603A and 603B are tuned to a higher reflectivity state. A larger portion of the image light 620 is reflected by the two leftmost bulk mirrors 603A and 603B and out-coupled as a light ray cone 621 propagating towards the user's eye pupil 605, enabling a larger portion of the image light 620 to reach the user's eye 604.

Turning to FIG. 6B for comparison with FIG. 6A, the user's eye 604 is shifted to the right, and is located on the right side of the illustrated waveguide. The image light 620 impinges on the four bulk mirrors 603A-603D at the same angles as in FIG. 6A. The two leftmost bulk mirrors, 603A and 603B, are tuned to have their reflectivity reduced, e.g. to substantially zero or very low reflectivity, being substantially transparent to the propagating image light 620.

The image light 620 propagates through the two leftmost bulk mirrors 603A and 603B substantially without losing its optical power level. The two rightmost bulk mirrors 603C and 603D are tuned to have a higher level of reflectivity. The image light 620 is reflected by the two rightmost bulk mirrors 603C, 603D and is out-coupled towards the user's eye pupil 605 as a light ray cone 622.

The out-coupled light may follow the eye-pupil position from one location to another when the user looks at different objects displayed by the display device, and/or when the user shifts the eyes relatively to the display device, which may occur e.g. during adjustment of an AR goggles on the user's face. The image light portions may be out-coupled depending on eye position and interpupillary distance of different users of the AR goggles. The two out-coupled rays 621 of FIG. 6A and 622 of FIG. 6B are boundary rays of the out-coupled light cone corresponding to the out-coupled FOV. The bulk mirrors 603A-603D may be continuously tunable to provide more smooth light control, without abrupt optical power drops between different eye locations.

Figure 7:
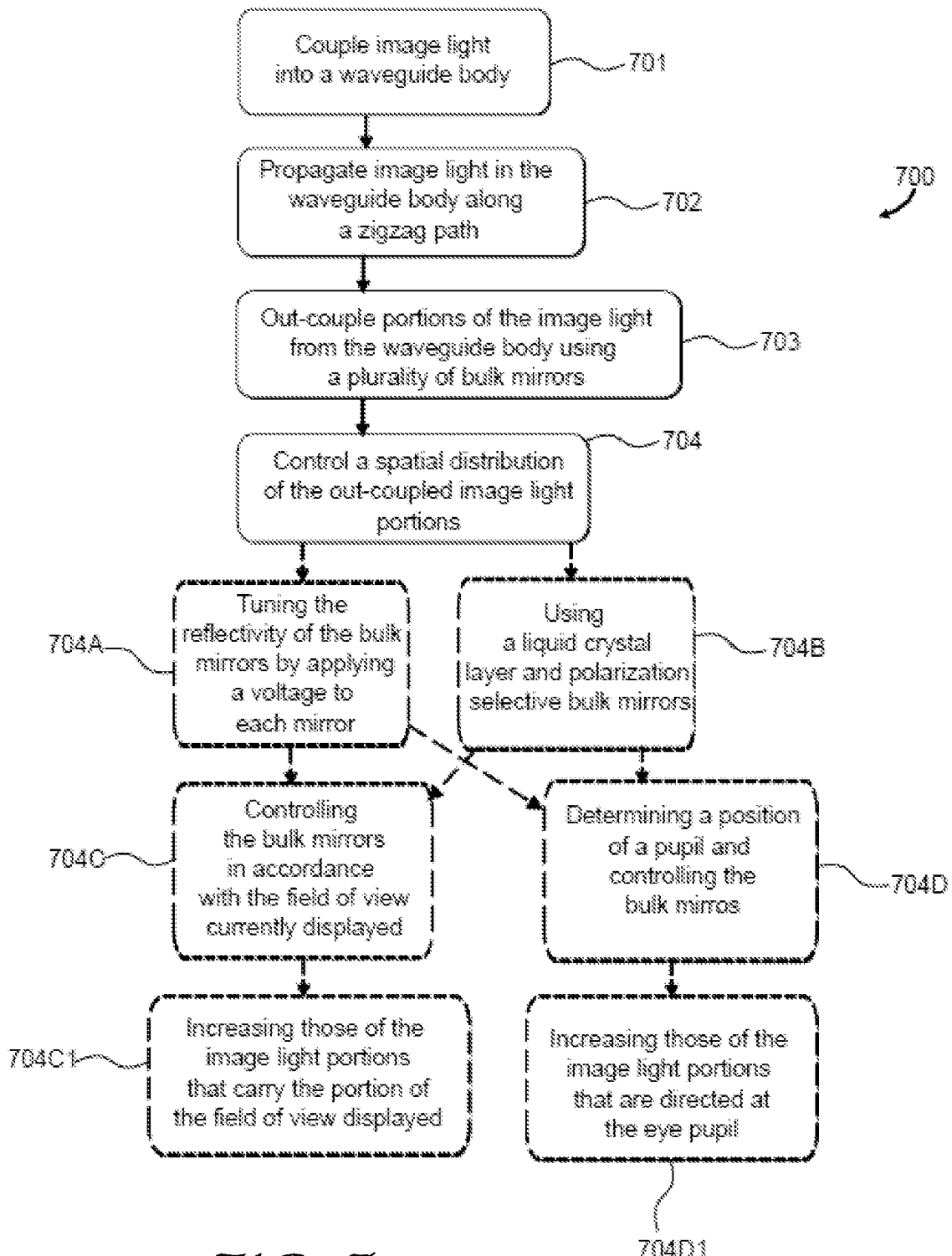
FIG. 7 is a flow chart of a method for conveying image light from an image projector to an eyebox of a display device.

Referring now to FIG. 7 with further reference to FIG. 4, a method 700 for conveying image light by a display device to an eyebox of the display device, is presented. The method 700 may be used e.g. for conveying the image light 420 emitted by the image projector 433 to the eyebox 450 of the display device 430 (FIG. 4).

The method 700 comprises coupling (FIG. 7; 701) the image light 420 into a waveguide body, e.g. in-coupling the image light 420 into the waveguide body 401 using the in-coupler 402. The image light 420 may be polarized in some embodiments.

Upon entering the waveguide body 401, the image light 420 propagates (702) within the waveguide body 401 along a zigzag image light path defined by alternating reflections of the image light 420 from the first 411 and second 412 surfaces of the waveguide body 401. As the image light 420 propagates along the zigzag path, the image light 420 propagates through a plurality of slanted bulk mirrors 403, one by one. The slanted bulk mirrors 403 have a tunable reflectivity. The tunable reflectivity may be achieved by applying voltages to individual slanted bulk mirrors 403, as explained above with reference to FIG. 2, and/or by using a liquid crystal layer in combination with polarization-selective bulk mirrors, as explained above with reference to FIGS. 3A and 3B.

Portions of the image light are out-coupled (FIG. 7; 703) from the waveguide body 401 (FIG. 4) by the plurality of slanted bulk mirrors 403. The out-coupling occurs by reflection of the image light 420 from the surfaces of the bulk mirrors 403. A portion or all the image light 420 may be out-coupled by any one bulk mirror 403. The combination of the plurality of image light 420 portions 421 out-coupled from their respective bulk mirrors 403 form the image in an angular domain at the eyebox 450 of the display device 430.

The reflectivity of each bulk mirror 403 of the plurality of slanted bulk mirrors 403 may be tuned to control (FIG. 7; 704) the spatial distribution of image light portions out-coupled from the waveguide body 401 by the plurality of slanted bulk mirrors 403. Each bulk mirror 403 may be tuned independently from another bulk mirrors 403. More than one bulk mirror 403 may be tuned together, simultaneously or sequentially, to provide a desired distribution of optical power density of the out-coupled image light portions.

In some embodiments, the reflectivity of the bulk mirrors 403 may be tuned (704A) by applying a set of voltages to the bulk mirrors 403. The reflectivity of the plurality of slanted bulk mirrors 403 may be tuned (704C) in a spatially-selective manner, in accordance with a portion of a field of view currently displayed by the image projector 433, e.g. to increase (704C1) those of the image light portions 420 that carry the portion of the field of view currently displayed by the image projector 433 to the eye of the user. In some embodiments, tuning the reflectivity of the voltage-controlled bulk mirrors 403 may be done in accordance with determining (704D) a position of a pupil of a user's eye at the eyebox of the display device 430, e.g. to increase (704D1) those of the image light portions that are directed precisely at the eye pupil. Furthermore in some embodiments, the reflectivity of the bulk mirrors may be tuned in accordance with both the FOV portion currently displayed and the current position of the eye pupil.

Still referring to FIG. 7 with further reference to FIGS. 3A-3B and FIG. 4, the controlling (FIG. 7; 704) of the spatial distribution of the out-coupled image light 320 portions may be implemented by controlling a polarization state of the image light 320. The polarization state may be controlled by using a liquid crystal layer or layers, as explained above with reference to FIGS. 3A and 3B, to control (704B), in a spatially-selective manner, a state of polarization of the image light 320 propagating along the image light 320 path 322A or 322B. In such embodiments, each bulk mirror 303 of the plurality of slanted bulk mirrors 303 may be made polarization-selective to provide reflectivity that varies depending upon the state of polarization of the impinging image light. In other embodiments, some of the bulk mirrors 303 are polarization-selective, while some are not. Referring for definiteness to the embodiment 300A depicted in FIG. 3A, the liquid crystal layer 305 and the bulk mirrors 303 are disposed in the zigzag light path 322A within the waveguide body 301A. The polarization state of the image light 320 changing as the image light 320 propagates along the light path 322A, in accordance with the required optical power density distribution of the out-coupled image light portions.

Controlling 704 the spatial distribution of the out-coupled image light 320 portions by controlling image light polarization may include controlling 704C the reflectivity of the plurality of slanted bulk mirrors 303 in a spatially-selective manner in accordance with a portion of a field of view currently displayed by the image projector, thereby increasing (704C1) those of the image light 320 portions that carry the portion of the field of view displayed by the image projector. In some embodiments, controlling (704) the spatial distribution of out-coupled image light 320 portions includes determining a position of a pupil of a user's eye 404 at the eyebox of the display device 430, and controlling the spatial distribution of polarization of the image light to re-distribute the out-coupled image light portions by relying upon the polarization-dependent reflectivity of the plurality of slanted mirrors 303. Such control may be performed in accordance with the determined position (704D) of the pupil 405, thereby increasing 704D1 those of the image light 320 portions that are directed at the eye pupil. The purpose of eye pupil position and/or FOV-dependent reflectivity control of the slanted bulk mirrors is to re-distribute the optical power of the out-coupled image light portions to direct most of the image light to the current eye pupil location while avoiding illuminating eyebox portions where eye pupil is not present, thereby avoiding unnecessary light losses and considerably increasing the overall efficiency of light utilization by the display device. The above considerations are equally applicable to the waveguide embodiment 300B of FIG. 3B.

In the waveguides and methods considered herein, not only the magnitude of reflectivity but also a direction of maximum reflectivity, i.e. an effective slant angle of the slanted reflectors, may be controlled/tuned for a more flexible redirection of the output image light. Accordingly, the term "reflectivity" is to be understood to mean the magnitude and/or the direction of maximum reflectivity, i.e. the direction of the out-coupled light.

Figure 8A:
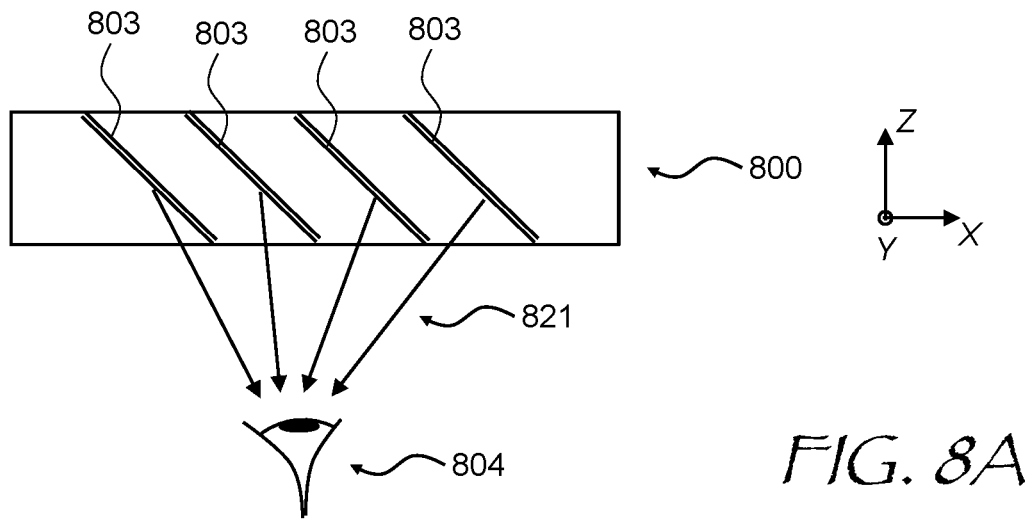
FIG. 8A is a side cross-sectional view of a waveguide including slanted mirrors with a tunable slant angle.
Figure 8B:
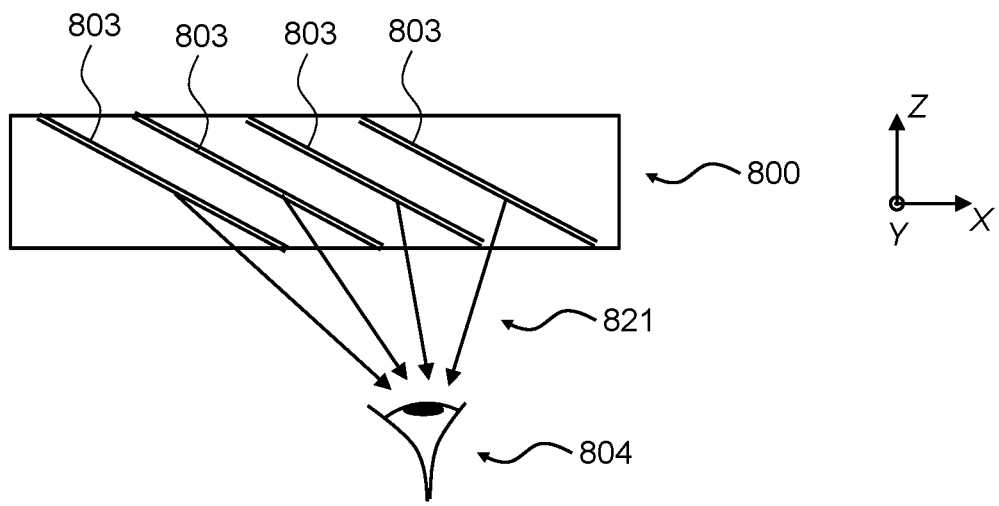
FIG. 8B is a side cross-sectional view of the waveguide of FIG. 8A at a different location of the viewer's eye.
Figure 11:
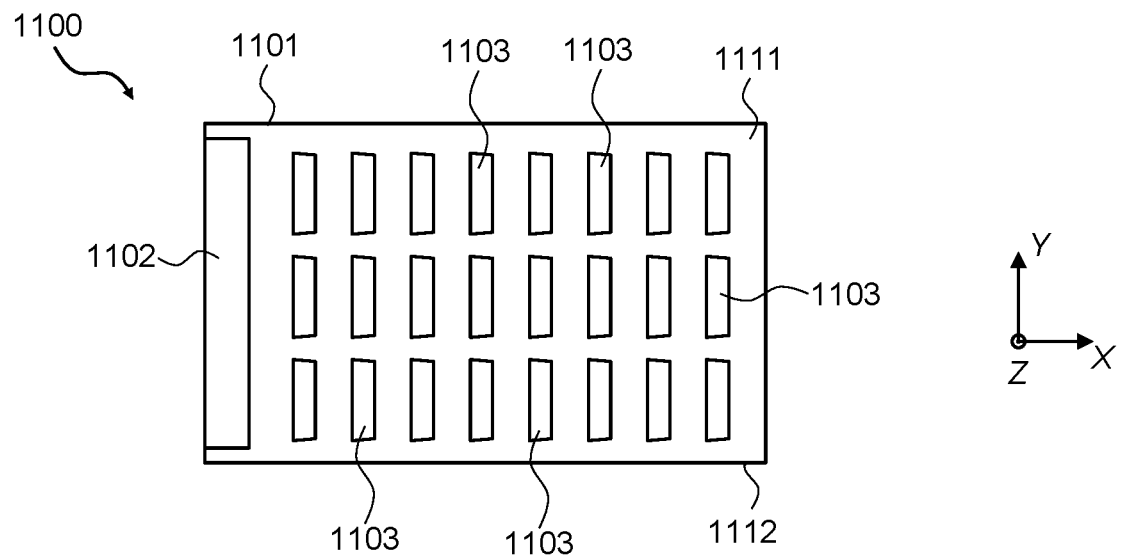
FIG. 11 is a top view of a waveguide of this disclosure including a two-dimensional (2D) array of slanted bulk mirrors in XY plane.

Referring for a non-limiting illustrative example to FIGS. 8A and 8B, a waveguide 800 includes a plurality of slanted reflectors 803 with a tunable slant angle. When an eye 804 of the display's user is at a first location as shown in FIG.

8A, the slant angle of the reflectors 803 is selected to direct portions 821 of the out-coupled image light towards the first location. When the eye 804 shifts to a second location as determined, for example, by an eye-tracking system (e.g. the eye tracking system 432 in FIG. 4), the slant angle of the mirrors 803 is adjusted to redirect the portions 821 of the out-coupled image light towards the second location, as shown in FIG. 8B.

One implementation of a waveguide with slanted mirrors having a tunable slant angle/maximum reflectivity direction is shown in FIGS. 9A to 9C. Referring first to FIG. 9A, a waveguide 900 includes a cholesteric LC layer 904 having LC molecules 924 between a pair of transparent electrodes 905, 906. The LC molecules 924 form helices 925 that operate as reflectors with voltage-controlled tilt angles. By applying voltage between the electrodes 905, 906, the helix angle can be controlled. For example, in FIG. A, the voltage is zero, and the helices 925 are disposed perpendicular to the electrodes 905, 906. In FIG. 1B, a non-zero voltage $V_1$ is applied, causing the helices 925 to tilt. The tilt angle increases with the voltage, as can be seen by comparing FIG. 9B and FIG. 9C where the applied voltage is increased to a value $V_2 > V_1$.

The effect of the applied voltage on the direction of maximum reflectivity of the image light by the variable-angle reflectors formed by the helices 925 is illustrated in FIG. 10. A dotted-line bell-shaped curve 1000A corresponds to reflectivity at zero applied voltage, i.e. to the case illustrated in FIG. 9A; a dashed-line bell-shaped curve 1000B corresponds to reflectivity at the applied voltage $V_1$, i.e. to the case illustrated in FIG. 9B; and a solid-line bell-shaped curve 1000C corresponds to reflectivity at the applied voltage $V_2$, i.e. to the case illustrated in FIG. 9C. One can see that as the voltage applied to the electrodes 905, 906 increases, a direction of maximum reflectivity, corresponding to peaks of the bell-shaped curves 1000A, 1000B, and 1000C, shifts towards higher angle values.

In some embodiments, the slanted bulk reflectors of the waveguide body may form two-dimensional (2D) or three-dimensional (3D) arrays of mirrors, for providing additional flexibility of the image light out-coupling and redirection. Referring for an illustrative non-limiting example to FIG. 11, a waveguide 1100 is similar to the waveguide 100 of FIG. 1, and includes similar elements. The waveguide 1100 of FIG. 11 includes a waveguide body 1101 having first 1111 and second 1112 opposed surfaces running parallel to each other, e.g. flat parallel surfaces. In the top view of FIG. 11, the first 1111 and second 1112 surfaces are disposed one under another.

An input coupler 1102 is configured to couple image light into the waveguide body 1101 for propagating the image light within the waveguide body 1101 along a zigzag light path similar to what was explained above with reference to FIGS. 1A, 1B. The zigzag light path is defined by alternating reflections of the image light from the first 1111 and second 1112 surfaces.

A plurality of slanted bulk mirrors 1103 is disposed along the zigzag light path within the waveguide body 1101. The slanted bulk mirrors 1103 have a tunable reflectivity for controlling a spatial distribution of image light portions out-coupled from the waveguide body 1101 by the plurality of slanted bulk mirrors 1103, similar to what was explained above with reference to FIGS. 1A-1B, FIG. 2, and FIGS. 3A-3B. The slanted bulk mirrors 1103 form a 2D array of slanted bulk mirrors, as illustrated. A plane of the 2D array is parallel to the surfaces 1111, 1112 of the waveguide body 1101, i.e. is parallel to the plane of FIG. 11, or XY plane.

Herein, the term "the plane of the 2D array" refers to a plane in which centers of the slanted bulk mirrors 1103 are disposed. The 2D array enables one to control the FOV and/or output light power distribution as explained above with reference to FIGS. 4 and 7 in two dimensions, i.e. in both X- and Y-directions.

Figure 12:
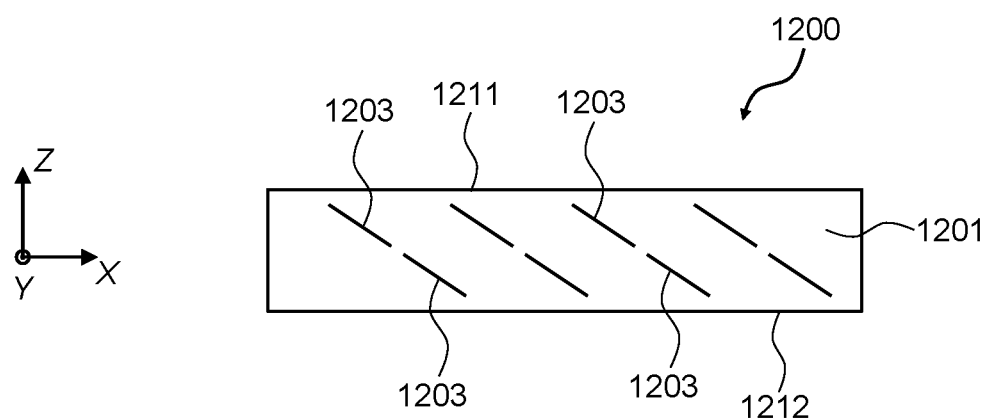
FIG. 12 is a side cross-sectional view of a waveguide of this disclosure including a 2D array of slanted bulk mirrors in XZ plane.

Turning to FIG. 12, a waveguide 1200 is similar to the waveguide 100 of FIG. 1, and includes similar elements. The waveguide 1200 of FIG. 12 includes a waveguide body 1201 having first 1211 and second 1212 opposed surfaces running parallel to each other, e.g. flat parallel surfaces. The image light propagates within the waveguide body 1201 along a zigzag light path as explained above with reference to FIGS. 1A, 1B. The zigzag light path is defined by alternating reflections of the image light from the first 1211 and second 1212 surfaces.

A plurality of slanted bulk mirrors 1203 is disposed along the zigzag light path within the waveguide body 1201. The slanted bulk mirrors 1203 have a tunable reflectivity for controlling a spatial distribution of image light portions out-coupled from the waveguide body 1201 by the plurality of slanted bulk mirrors 1203, as explained above with reference to FIGS. 1A-1B, FIG. 2, and FIGS. 3A-3B.

The slanted bulk mirrors 1203 form a 2D array of slanted bulk mirrors in XZ plane, such that the plane of the two-dimensional array is non-parallel to the first 1211 and second 1212 surfaces of the waveguide body 1201. Such configuration enables independent performance control of image light propagation and out-coupling in the top and bottom portions of the waveguide body 1201 (w.r.t. Z-axis), which enables one to improve the uniformity of the out-coupled image light portions.

Figure 13:
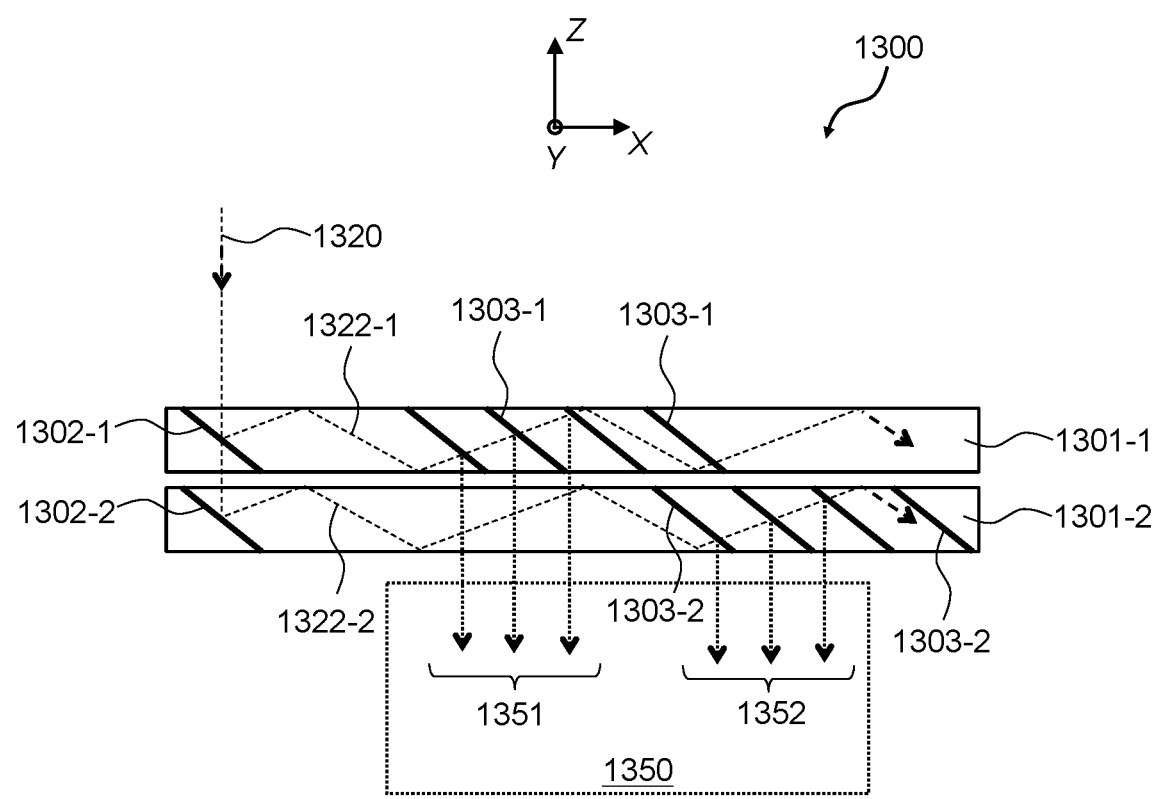
FIG. 13 is a side cross-sectional view of a waveguide of this disclosure including a stack of two waveguide bodies and a tunable input coupler in the upper waveguide body.

Referring to FIG. 13, a waveguide 1300 includes not one but two waveguide bodies, a first waveguide body 1301-1 and a second waveguide body 1301-2 having first and second input couplers respectively. The first input coupler includes a first slanted bulk mirror 1302-1 in the first waveguide body 1301-1. The first slanted bulk mirror 1302-1 may be tunable for in-coupling a controllable portion of image light 1320 into the first waveguide body 1301-1 for propagation within the first waveguide body 1301-1 along a first zigzag light path 1322-1 defined by alternating reflections of the image light from the parallel outer surfaces of the first waveguide body 1301-1. A first plurality of slanted bulk mirrors 1303-1 is disposed within the first waveguide body 1301-1 along the first zigzag light path 1322-1. The mirrors 1303-1 of the first plurality may be a constant reflectivity or tunable reflectivity mirrors.

The second input coupler includes a second slanted bulk mirror 1302-2 in the second waveguide body 1301-2. The second slanted bulk mirror 1302-2 may have a fixed or tunable reflectivity. The second slanted bulk mirror 1302-2 may be configured for in-coupling the remaining portion of the image light 1320 into the second waveguide body 1301-2 for propagation within the second waveguide body 1301-2 along a second zigzag light path 1322-2 defined by alternating reflections of the image light from the parallel outer surfaces of the second waveguide body 1301-2.

A second plurality of slanted bulk mirrors 1303-2 is disposed within the second waveguide body 1301-2 along the second zigzag light path 1322-2. The mirrors 1303-2 of the second plurality may have a constant reflectivity or tunable reflectivity.

In operation, the first slanted bulk mirror 1302-1 is tuned to a high or low reflectivity depending upon a desired location in an eyebox 1350 to be illuminated with the image light 1320. For example, when the first slanted bulk mirror 1302-1 is tuned to a high reflectivity, most or all of the image light 1320 propagates along the first zigzag light path 1322-1 in the first waveguide body 1301-1 and, accordingly, is out-coupled from the first waveguide body 1301-1 at a first location 1351. When the first slanted bulk mirror 1302-1 is tuned to a low reflectivity, most or all of the image light 1320 propagates in the second waveguide body 1301-2 along the second zigzag light path 1322-2 and is out-coupled from the second waveguide body 1301-2 at a second, shifted location 1352. Such configuration may be simpler than e.g. the configuration of the waveguide 100 of FIGS. 1A and 1B in that it requires only one tunable mirror. In other words, only one slanted bulk mirror of all the bulk mirrors supported by the first waveguide body 1301-1 needs to be tunable to have some capacity of redistributing the image light 1320 across the eyebox 1350.

In some embodiments, the first slanted bulk mirror 1302-1 is polarization-selective e.g. includes a reflective polarizer, and the image light power balance between the first 1301-1 and second 1301-2 waveguide bodies may be regulated by tuning the polarization state of the image light 1320. Furthermore in some embodiments, the waveguide assembly may include more than two waveguide bodies, with respective tunable in-couplers of all but most downstream waveguide body.

Figure 14A:
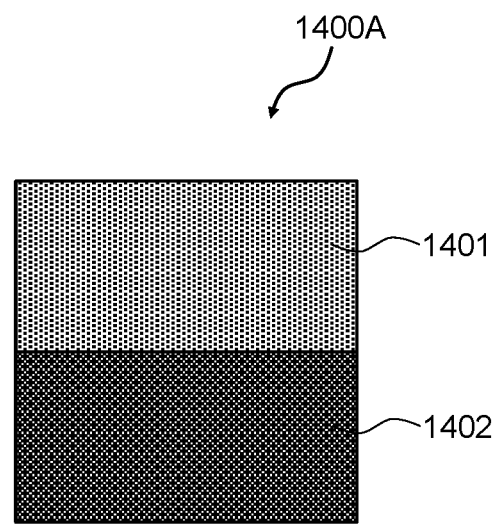
FIG. 14A is a plan view of a variable mirror of this disclosure, the variable mirror having two segments characterized by independently variable, spatially uniform reflectivity.

Turning to FIG. 14A, a variable mirror 1400A may be used as a variable slanted bulk reflector in any of the waveguides considered above, including in-coupling and/or out-coupling slanted mirror(s). The variable reflector 1400A includes first 1401 and second 1402 segments having independently variable, spatially uniform reflectivity. This may be achieved by providing a segmented electrically responsive reflector layer such as the layer 202 in FIG. 2, a segmented liquid crystal cell followed by a reflective polarizer, etc.

Figure 14B:
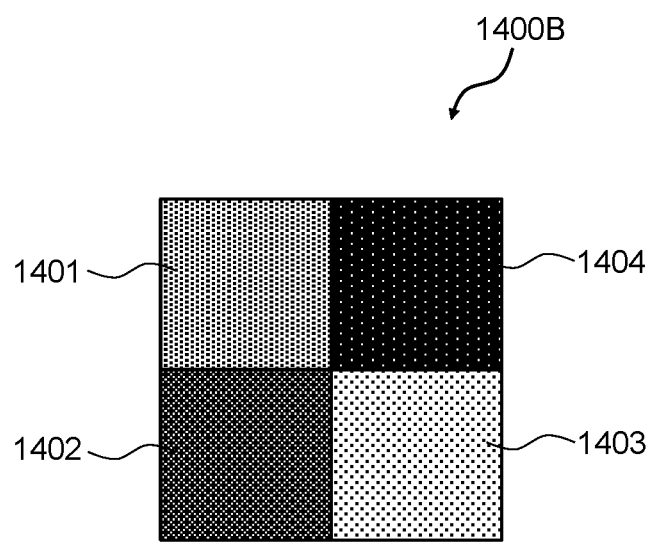
FIG. 14B is a plan view of a variable mirror of this disclosure, the variable mirror having a quadrant of segments characterized by independently variable, spatially uniform reflectivity.

Referring to FIG. 14B, a variable mirror 1400B may be used as a variable slanted bulk reflector in any of the waveguides considered above, including in-coupling and/or out-coupling mirror(s)/reflector(s). The variable reflector 1400B of FIG. 14B includes not two but four individually controlled reflector segments, specifically first 1411, second 1412, third 1413, and fourth 1414 quadrant segments based on electrically responsive reflector layers, liquid crystal segmented cells and reflective polarizers, etc. Segmented variable mirrors allow a finer control of distribution of optical power of the out-coupled image light portions.

Figure 15:
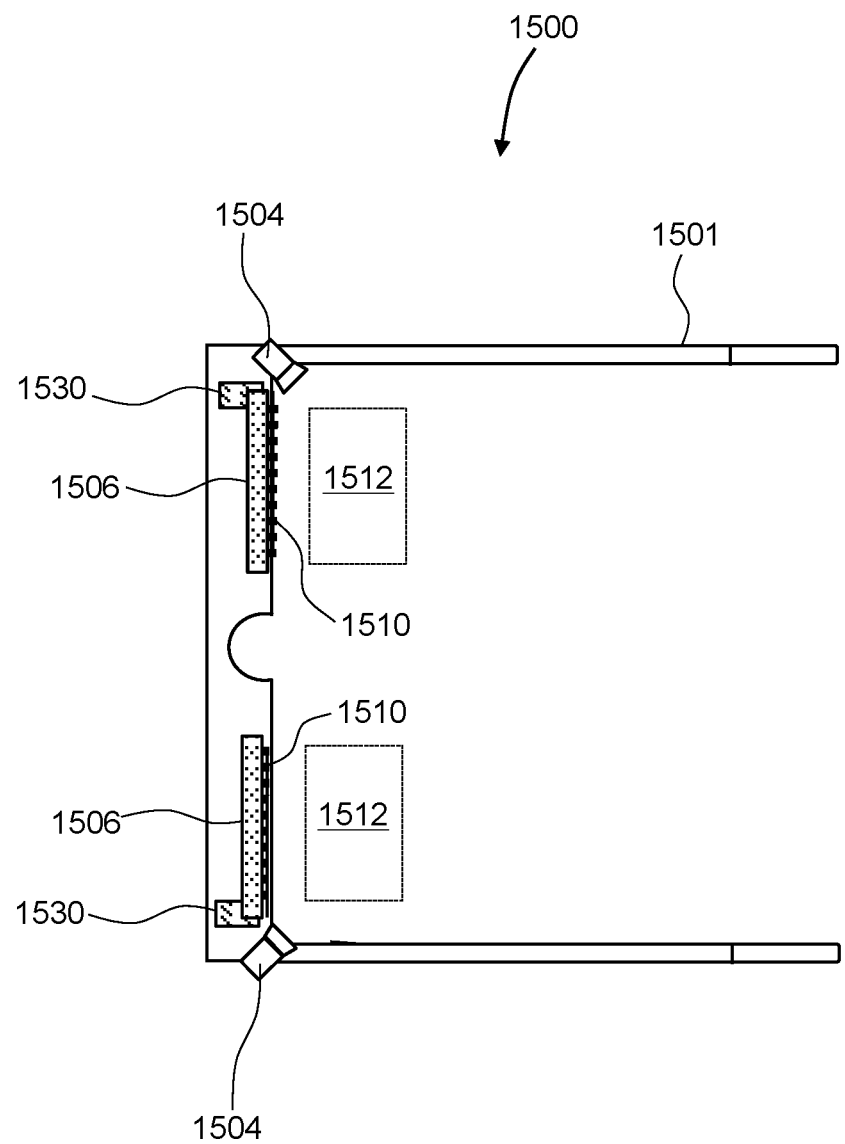
FIG. 15 is a view of wearable display of this disclosure having a form factor of a pair of eyeglasses.

Referring now to FIG. 15, an augmented reality (AR) near-eye display 1500 is an embodiment of the display device 430 of FIG. 4. The AR near-eye display 1500 of FIG. 15 includes a frame 1501 supporting, for each eye: a light engine or image projector 1530 for providing an image light beam carrying an image in angular domain, a pupil-replicating lightguide 1506 based on any of the waveguides disclosed herein, for providing multiple offset portions of the image light beam to spread the image in angular domain across an eyebox 1512, and a plurality of eyebox illuminators 1510, shown as black dots, spread around a clear aperture of the pupil-replicating lightguide 1506 on a surface that faces the eyebox 1512. An eye-tracking camera 1504 may be provided for each eyebox 1512.

The purpose of the eye-tracking cameras 1504 is to determine position and/or orientation of both eyes of the user. The eyebox illuminators 1510 illuminate the eyes at the corresponding eyeboxes 1512, allowing the eye-tracking cameras 1504 to obtain the images of the eyes, as well as to provide reference reflections i.e. glints. The glints may function as reference points in the captured eye image, facilitating the eye gazing direction determination by determining position of the eye pupil images relative to the glint positions. To avoid distracting the user with the light of the eyebox illuminators 1510, the latter may be made to emit light invisible to the user. For example, infrared light may be used to illuminate the eyeboxes 1512.

Figure 16:
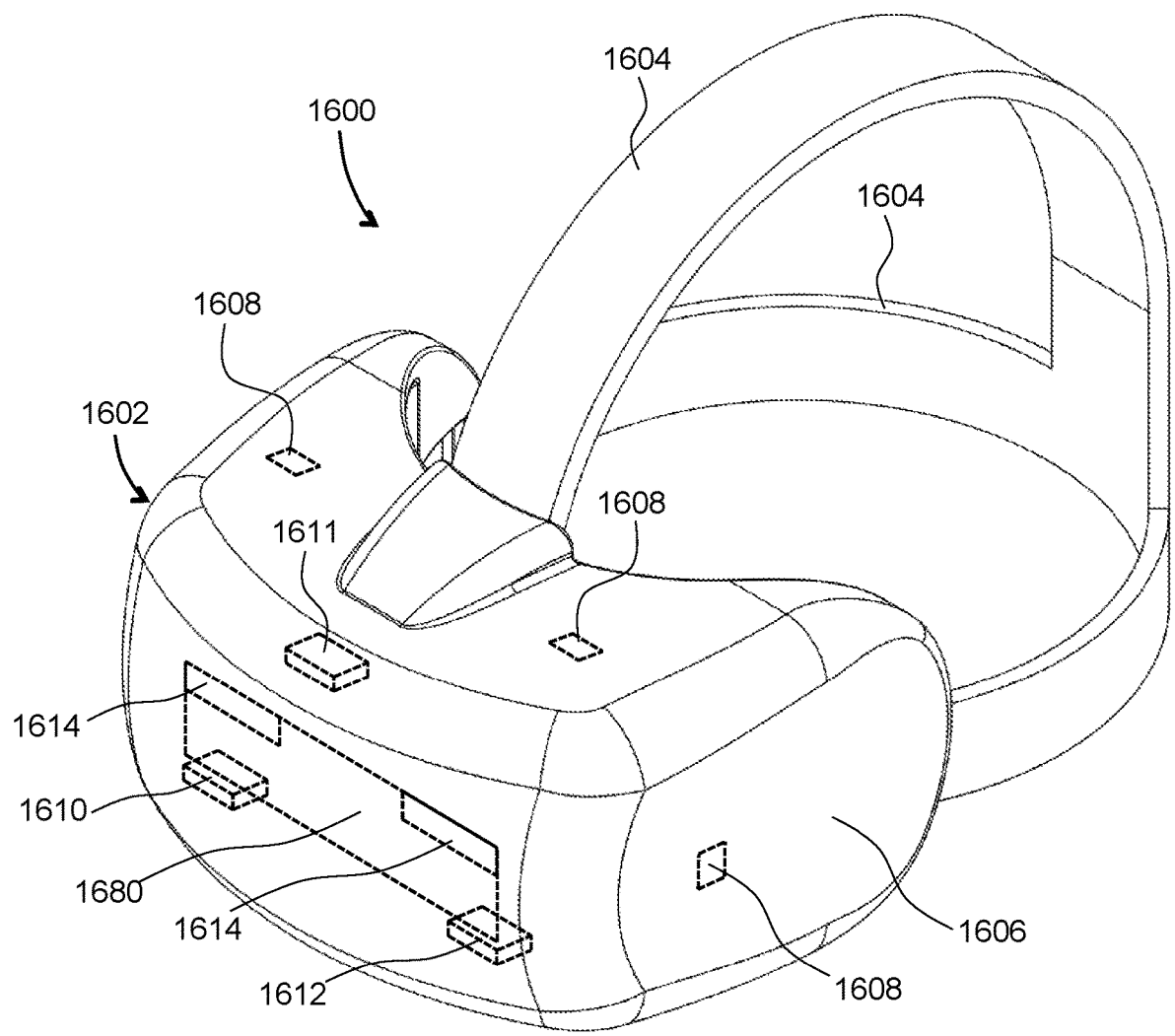
FIG. 16 is a three-dimensional view of a head-mounted display (HMD) of this disclosure.

Turning to FIG. 16, an HMD 1600 is an example of an AR/VR wearable display system which encloses the user's face, for a greater degree of immersion into the AR/VR environment. The HMD 1600 may generate the entirely virtual 3D imagery. The HMD 1600 may include a front body 1602 and a band 1604 that can be secured around the user's head. The front body 1602 is configured for placement in front of eyes of a user in a reliable and comfortable manner. A display system 1680 may be disposed in the front body 1602 for presenting AR/VR imagery to the user. The display system 1680 may include any of the display devices and illuminators disclosed herein. Sides 1606 of the front body 1602 may be opaque or transparent.

In some embodiments, the front body 1602 includes locators 1608 and an inertial measurement unit (IMU) 1610 for tracking acceleration of the HMD 1600, and position sensors 1612 for tracking position of the HMD 1600. The IMU 1610 is an electronic device that generates data indicating a position of the HMD 1600 based on measurement signals received from one or more of position sensors 1612, which generate one or more measurement signals in response to motion of the HMD 1600. Examples of position sensors 1612 include: one or more accelerometers, one or more gyroscopes, one or more magnetometers, another suitable type of sensor that detects motion, a type of sensor used for error correction of the IMU 1610, or some combination thereof. The position sensors 1612 may be located external to the IMU 1610, internal to the IMU 1610, or some combination thereof.

The locators 1608 are traced by an external imaging device of a virtual reality system, such that the virtual reality system can track the location and orientation of the entire HMD 1600. Information generated by the IMU 1610 and the position sensors 1612 may be compared with the position and orientation obtained by tracking the locators 1608, for improved tracking accuracy of position and orientation of the HMD 1600. Accurate position and orientation is important for presenting appropriate virtual scenery to the user as the latter moves and turns in 3D space.

The HMD 1600 may further include a depth camera assembly (DCA) 1611, which captures data describing depth information of a local area surrounding some or all of the HMD 1600. The depth information may be compared with the information from the IMU 1610, for better accuracy of determination of position and orientation of the HMD 1600 in 3D space.

The HMD 1600 may further include an eye tracking system 1614 for determining orientation and position of user's eyes in real time. The obtained position and orientation of the eyes also allows the HMD 1600 to determine the gaze direction of the user and to adjust the image generated by the display system 1680 accordingly. The determined gaze direction and vergence angle may be used to adjust the display system 1680 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1602.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide for conveying image light in a display device, the waveguide comprising:
    a waveguide body comprising first and second opposed surfaces running parallel to each other;
    an input coupler configured to couple the image light into the waveguide body for propagating the image light within the waveguide body along a zigzag light path defined by alternating reflections of the image light from the first and second surfaces; and
    a plurality of slanted bulk mirrors disposed along the zigzag light path within the waveguide body and having a tunable reflectivity for controlling a spatial distribution of image light portions out-coupled from the waveguide body by the plurality of slanted bulk mirrors, wherein a slanted bulk mirror of the plurality of slanted bulk mirrors comprises a plurality of segments, each segment having an independently variable spatially uniform reflectivity.

2. The waveguide of claim 1, wherein a slanted bulk mirror of the plurality of slanted bulk mirrors comprises a voltage-controlled mirror having at least one of a reflectivity magnitude or a direction of maximum reflectivity variable by application of voltage to the voltage-controlled mirror.

3. The waveguide of claim 1, wherein a slanted bulk mirror of the plurality of slanted bulk mirrors is polarization-selective, the waveguide further comprising a liquid crystal layer in the zigzag light path within the waveguide body for spatially-selective control of a state of polarization of the image light propagating along the zigzag light path, thereby controlling the spatial distribution of the image light portions.

4. The waveguide of claim 3, wherein the waveguide body comprises a stack of:
    a substrate supporting the plurality of slanted bulk mirrors;
    a backplane electrode;
    the liquid crystal layer; and
    a pixelated electrode layer for application of spatially-varying electric field to the liquid crystal layer by applying spatially-varying electric field between the backplane and pixelated electrode layers;
    wherein the zigzag light path runs through the stack.

5. The waveguide of claim 1, wherein the input coupler comprises at least one slanted bulk mirror of the plurality of slanted bulk mirrors.

6. The waveguide of claim 1, wherein the plurality of slanted bulk mirrors comprises a two-dimensional or three-dimensional array of slanted bulk mirrors.

7. The waveguide of claim 6, wherein a plane of the two-dimensional array is parallel to the first and second surfaces of the waveguide body.

8. The waveguide of claim 6, wherein a plane of the two-dimensional array is non-parallel to the first and second surfaces of the waveguide body.

9. The waveguide of claim 1, wherein a slanted bulk mirror of the plurality of slanted bulk mirrors has a tunable slant angle.

10. A display device comprising:
    an image projector configured to provide image light carrying an image in angular domain; and
    a waveguide for conveying the image light in the display device, the waveguide comprising:
        a waveguide body comprising first and second opposed surfaces running parallel to each other;
        an input coupler configured to couple the image light into the waveguide body for propagating the image light within the waveguide body along a zigzag light path defined by alternating reflections of the image light from the first and second surfaces; and
        a plurality of slanted bulk mirrors disposed along the zigzag light path within the waveguide body and having a tunable reflectivity for controlling a spatial distribution of image light portions out-coupled from the waveguide body by the plurality of slanted bulk mirrors, wherein a slanted bulk mirror of the plurality of slanted bulk mirrors comprises a plurality of segments, each segment having an independently variable spatially uniform reflectivity.

11. The display device of claim 10, wherein each bulk mirror of the plurality of slanted bulk mirrors comprises a voltage-controlled mirror having at least one of a reflectivity magnitude or a direction of maximum reflectivity variable by application of voltage to the voltage-controlled mirror.

12. The display device of claim 10, wherein each bulk mirror of the plurality of slanted bulk mirrors is polarization-selective, the waveguide further comprising a liquid crystal layer in the zigzag light path within the waveguide body for spatially-selective control of a state of polarization of the image light propagating along the zigzag light path, thereby controlling the spatial distribution of the image light portions.

13. The display device of claim 10, further comprising a controller operably coupled to the waveguide body and configured to control the reflectivity of the plurality of slanted bulk mirrors in a spatially-selective manner in accordance with a portion of a field of view currently displayed by the image projector.

14. The display device of claim 10, further comprising:
an eye tracking system configured to determine a position of a pupil of a user's eye at an eyebox of the display device; and
a controller operably coupled to the waveguide body and the eye tracking system and configured to control the reflectivity of the plurality of slanted bulk mirrors in a spatially-selective manner in accordance with the position of the pupil determined by the eye tracking system.

15. The display device of claim 10, wherein the display device is a near-eye display device.

16. A method for conveying image light from an image projector to an eyebox of a display device, the method comprising:
coupling the image light into a waveguide body;
propagating the image light in the waveguide body along a zigzag light path defined by alternating reflections of the image light from first and second opposed surfaces of the waveguide body;
out-coupling portions of the image light from the waveguide body by using a plurality of slanted bulk mirrors disposed along the zigzag light path within the waveguide body and having a tunable reflectivity; and
controlling a spatial distribution of image light portions out-coupled from the waveguide body by the plurality of slanted bulk mirrors by tuning the reflectivity of the plurality of slanted bulk mirrors including by tuning the reflectivity of a plurality of segments of a slanted bulk mirror of the plurality of slanted bulk mirrors, each segment having an independently variable spatially uniform reflectivity.

17. The method of claim 16, wherein controlling the spatial distribution of image light portions comprises tuning the reflectivity of the plurality of slanted bulk mirrors by applying a voltage to each bulk mirror, each bulk mirror being a voltage-controlled mirror.

18. The method of claim 16, wherein controlling the spatial distribution of image light portions comprises using a liquid crystal layer to control, in a spatially-selective manner, a state of polarization of the image light propagating along the zigzag light path, the liquid crystal layer being disposed in the zigzag light path within the waveguide body; and
wherein each bulk mirror of the plurality of slanted bulk mirrors is polarization-selective.

19. The method of claim 16, wherein controlling the spatial distribution of image light portions comprises controlling the reflectivity of the plurality of slanted bulk mirrors in a spatially-selective manner in accordance with a portion of a field of view currently displayed by the image projector, to increase those of the image light portions that carry the portion of the field of view displayed by the image projector to a user's eye.

20. The method of claim 16, wherein controlling the spatial distribution of image light portions comprises determining a position of a pupil of a user's eye at the eyebox of the display device;
the method further comprising controlling the reflectivity of the plurality of slanted mirrors in a spatially-selective manner in accordance with the determined position of the eye pupil, to increase those of the image light portions that reach a user's eye.

\* \* \* \* \*